United States Patent [19]

Waldron et al.

[11] Patent Number: 4,691,342
[45] Date of Patent: Sep. 1, 1987

[54] MULTI-SPEED, FULL DUPLEX MODEM

[75] Inventors: Mark A. Waldron, Elkhart, Ind.; Tommy Y. Leung, Cassopolis, Mich.

[73] Assignee: CTS Corporation, Elkhart, Ind.

[21] Appl. No.: 854,136

[22] Filed: Apr. 21, 1986

Related U.S. Application Data

[63] Continuation-in-part of Ser. No. 530,690, Sep. 9, 1983, Pat. No. 4,620,294.

[51] Int. Cl.⁴ .................... H04M 11/06; G06F 3/00
[52] U.S. Cl. .................................. 379/98; 375/46; 364/900
[58] Field of Search ................ 379/93, 96, 97, 98; 370/24; 375/8, 9, 46, 56, 89, 62, 14, 121

[56] References Cited

U.S. PATENT DOCUMENTS

| | | | |
|---|---|---|---|
| 3,793,486 | 2/1974 | Koziol | 379/98 |
| 3,937,882 | 2/1976 | Bingham | 370/24 |
| 3,958,191 | 5/1976 | Jones, Jr. | 375/62 X |
| 3,988,540 | 10/1976 | Scott et al. | 375/53 X |
| 4,008,373 | 2/1977 | Nash et al. | 375/56 X |
| 4,085,449 | 4/1978 | Walsh et al. | 364/900 |
| 4,236,248 | 11/1980 | Teranura et al. | 375/53 |
| 4,258,433 | 3/1981 | Herschtal et al. | 370/24 |
| 4,263,670 | 4/1981 | Sherman | 375/9 |
| 4,335,446 | 6/1982 | Gandini et al. | 364/900 |
| 4,387,440 | 6/1983 | Eaton | 364/900 |
| 4,404,532 | 9/1983 | Welti | |
| 4,419,756 | 12/1983 | Cheng-Quispe et al. | 379/98 |
| 4,440,988 | 4/1984 | Heatherington | 379/98 |
| 4,455,663 | 6/1984 | Ragsdale | 379/93 X |
| 4,575,858 | 3/1986 | Dow | 375/46 X |
| 4,620,294 | 10/1986 | Leung et al. | 364/900 |

OTHER PUBLICATIONS

"Choosing a Modem . . . ", Telecommunications, Apr. 1986, pp. 22-23.
Leopold, "Fastest Dial-Up Modem", Electronics, Mar. 24, 1986, pp. 24-25.
Stone "ComcoModem 2400PC", PC Magazine, Feb. 24, 1987, p. 43.
"IBM's New 2400 bps PC Modems", Telecommunications, Jan. 1987, pp. 6-7.
Bang, "Digital Signal Processing in Data Transmission Modems", Electrical Comm., vol. 59, No. 3, 1985.
Von Gerwen et al., "Microprocessor Implementation of High Speed Data Modem", Feb. 1977, IEEE Transaction on Communication, vol. Com-25, No. 2, pp. 238-250.
Watanabe et al., "A 4800 b/s Microprocessor Data Modem", IEEE Transactions on Communications, vol. Com-26, No. 5, pp. 493-498, May 1978.

*Primary Examiner*—Gene Z. Rubinson
*Assistant Examiner*—Matthew E. Connors
*Attorney, Agent, or Firm*—Rodger H. Flagg

[57] ABSTRACT

A multi-speed, full duplex modem is disclosed for transmitting and receiving analog signals over a telephone network in communication with a remote modem. The analog signals are converted to digital data for processing by a signal processor and a microcomputer. A bi-directional bus is disposed between the signal processor and the microcomputer for selectively transferring multiple bits of data in either a transmit or receive direction. One or more of the multiple bits of data are restricted to convey bus direction data in one of the transmit and receive directions, and not restricted in the other direction. The full duplex modem allows simultaneous transmission and reception of analog signals over the telephone network, at one of the multispeed data rates selected for compatability between the full duplex, multispeed modem and the remote modem.

20 Claims, 27 Drawing Figures

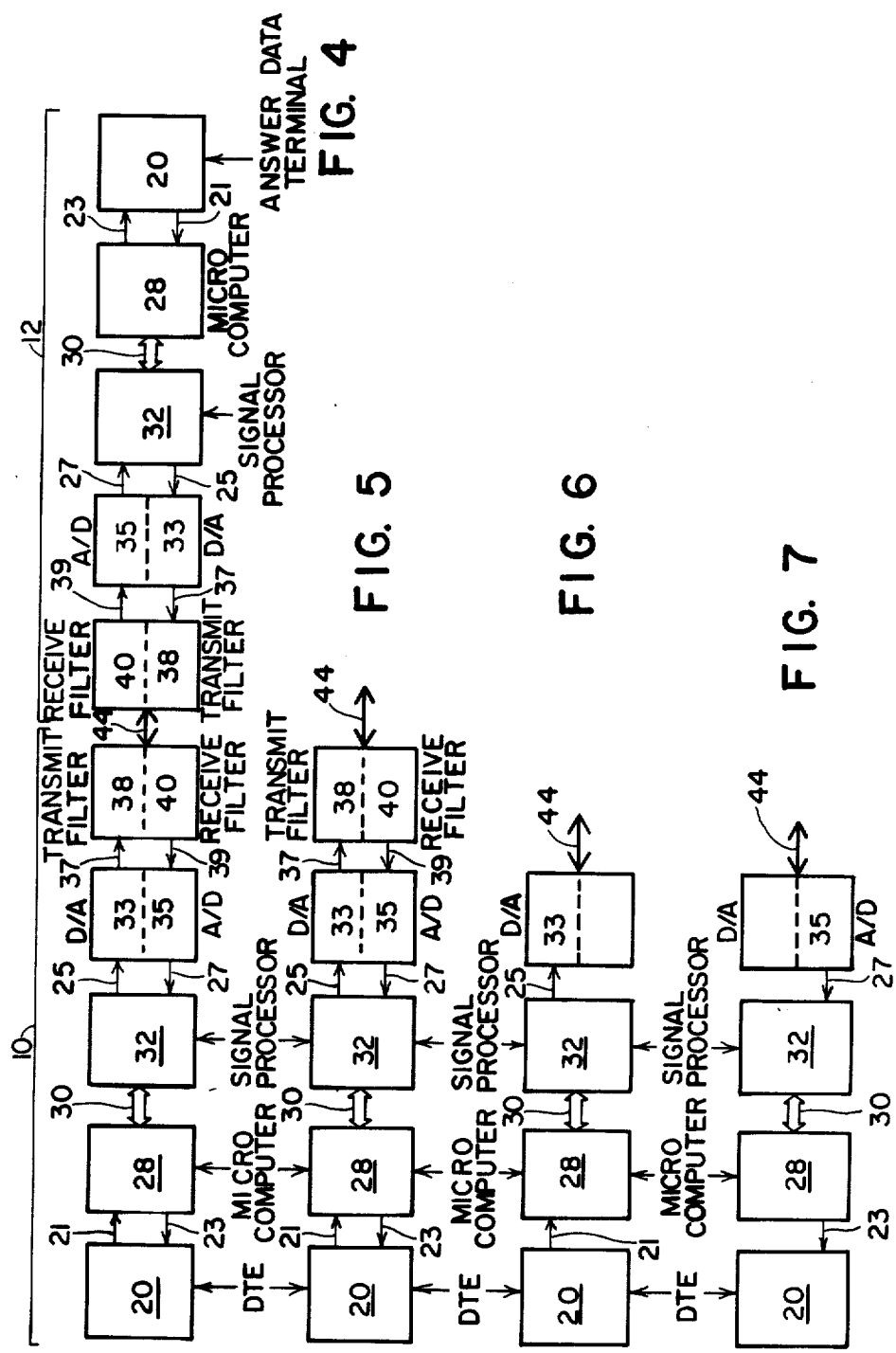

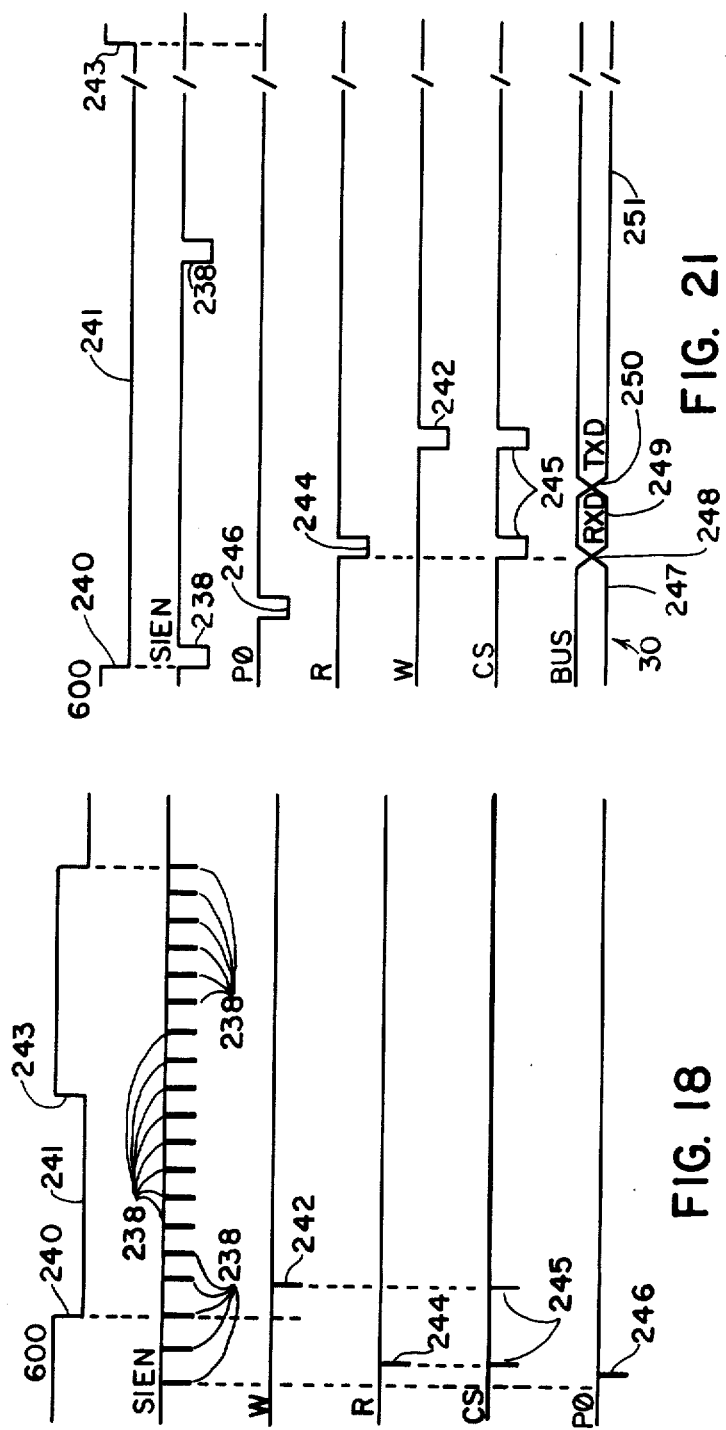

FIG. 23A

| LOCAL 2424AD ORIGINATING | | REMOTE ANSWERING MODEM | | | | |
|---|---|---|---|---|---|---|
| MODE | SPEED | U.S. 300 | U.S. 1200 | U.S. 2400 | EUROPEAN 1200 | EUROPEAN 2400 |
| U.S. | 300 | 300 | 300 | 300 | — | — |
| U.S. | 1200 | — | 1200 | 1200 | 1200 | 1200 |
| U.S. | 2400 | — | 1200 | 2400 | 1200 | 2400 |
| EUR. | 1200 | — | 1200 | 1200 | 1200 | 1200 |
| EUR. | 2400 | — | 1200 | 2400 | 1200 | 2400 |

FIG. 23B

| LOCAL 2424AD ANSWERING | | REMOTE CALLING MODEM | | | | |
|---|---|---|---|---|---|---|
| MODE | SPEED | U.S. 300 | U.S. 1200 | U.S. 2400 | EUROPEAN 1200 | EUROPEAN 2400 |
| U.S. | 300 | 300 | 1200 | 2400 | 1200 | 2400 |
| U.S. | 1200 | 300 | 1200 | 2400 | 1200 | 2400 |
| U.S. | 2400 | 300 | 1200 | 2400 | 1200 | 2400 |
| EUR. | 1200 | 300 | 1200 | 2400 | 1200 | 2400 |
| EUR. | 2400 | 300 | 1200 | 2400 | 1200 | 2400 |

MULTI-SPEED, FULL DUPLEX MODEM

This application is a continuation-in-part of pending U.S. patent application Ser. No. 530,690 filed Sept. 9, 1983, entitled "Digital Signal Processor Modem now U.S. Pat. No. 4,620,294, issued Oct. 25, 1986." The specification and drawings of application Ser. No. 530,690 are incorporated by reference herein.

TECHNICAL FIELD

The present invention relates to computer peripherals, and more particularly to modulator-demodulator (modem) systems for transmission and reception of data over voice grade telephone lines, such as direct distance dial (DDD) networks.

BACKGROUND ART

U.S. Pat. No. 4,620,294 relates to a dual speed, full duplex modem with a capability to transmit in the low speed asynchronous mode of 0-600 bits per second (b.p.s.) by coherent frequency shift keying (FSK), and to transmit in the high speed synchronous or asynchronous mode of 1200 b.p.s. by quadrature differential phase shift keying (QDPSR).

The present application relates to a multi-speed, full duplex modem, incorporating at least in part, the dual speed mode of application Ser. No. 530,690, with the addition of 2400 b.p.s. transmission speeds and adaptive equalization. One codec is used in the pending disclosure, and the separate multiplexer disclosed in the prior application is not used in the present application. An eight bit bi-directional bus is incorporated between the signal processor and the microcomputer in the present application, and a novel timing means is disclosed to enable the use of this eight bit bi-directional bus.

The novel features of this invention and the manner of attaining them will become more apparent and the invention itself will be best understood by reference to the following description of an embodiment of the invention, when considered in conjunction with the accompanying drawings.

BRIEF DESCRIPTION OF THE DRAWINGS

FIG. 4 illustrates a block diagram of the originate and answer modem system configuration.

FIG. 5 illustrates a block diagram of the 0-300, 600, 1200 and 2400 b.p.s. system configuration.

FIG. 6 is a block diagram of the DTMF system configuration.

FIG. 7 is a block diagram of the system configuratin of the line status detector.

FIG. 18 illustrates the preferred embodiment of the read-write timing diagram.

FIG. 21 illustrates the preferred embodiment of the bus during one cycle of the read/write SIEN interval.

FIG. 23A discloses a chart showing the preferred originating communication connections.

FIG. 23B discloses a chart showing the preferred answering communication connections.

The subject matter which I regard as my invention is particularly pointed out and distinctly claimed in the claims. The structure and operation of my invention, together with further objects and advantages, may be better understood from the following description given in connection with the accompanying drawings, in which FIG. 1 discloses a simplified block diagram of the operation of the modem.

Figure 1:
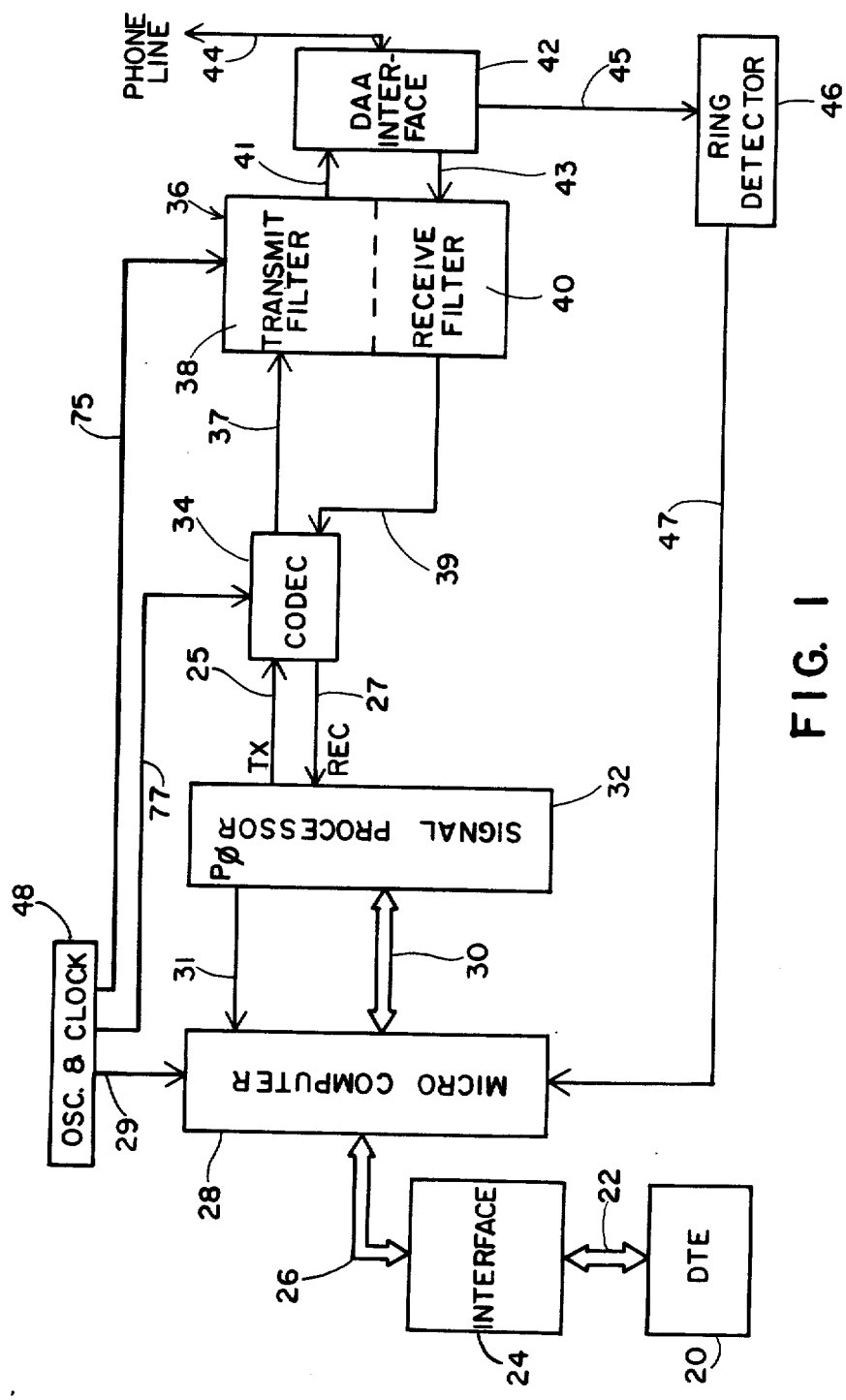
FIG. 1 is a simplified block diagram of the operation of the modem.

As shown in FIG. 1, digital data is transmitted through coupler 22 between the data terminal equipment (DTE) 20 and terminal interface 24. Terminal interface 24 is preferably a RS232C interface. Digital data is communicated through coupler 26 between the interface 24 and microcomputer 28.

Digital data is communicated between microcomputer 28 and signal processor 32 over a bi-directional bus 30. Transmit line 25 carries digital data from signal processor 32 to a converting means 34 such as a coder/decoder or codec. The converting means 34 comprises a digital-to-analog converter (D/A) 33 and an analog-to-digital converter (A/D) 35. Digital data from line 25 is converted by the D/A 33 to an analog signal which is transmitted over line 37 to a filter 36. Filter 36 preferably comprises a transmit filter portion 38 and a receive filter portion 40. The analog signal from line 37 passes through transmit filter 38 and passes over line 41 to the DAA interface 42.

Received analog signals passing from the DAA interface 42 are transferred by line 43 to receive filter 40, which passes the received analog signal over line 39 to the converting means 34. The analog signal is converted by the A/D 35 to digital data, which is routed over line 27 to the signal processor 32, then over bus 30 to microcomputer 28.

Pin P0 on signal processor 32 provides a configuring signal over line 31 to microcomputer 28 which temporarily configures bus 30 in a "read" mode.

The analog signal travels over a telephone network 44, such as a two wire or four wire telephone line, to communicate an analog signal between originate modem 10 and receive modem 12.

A ring detector circuit 46 receives a ring signal from the DAA interface 42 over line 45 and transmits the ring indication signal over line 47 to microcomputer 28.

An OSC and clock circuit 48 communicates a timing signal over line 29 to the microcomputer 28, over line 77 to the converting means 34, and over line 75 to filter 36.

Figure 2:
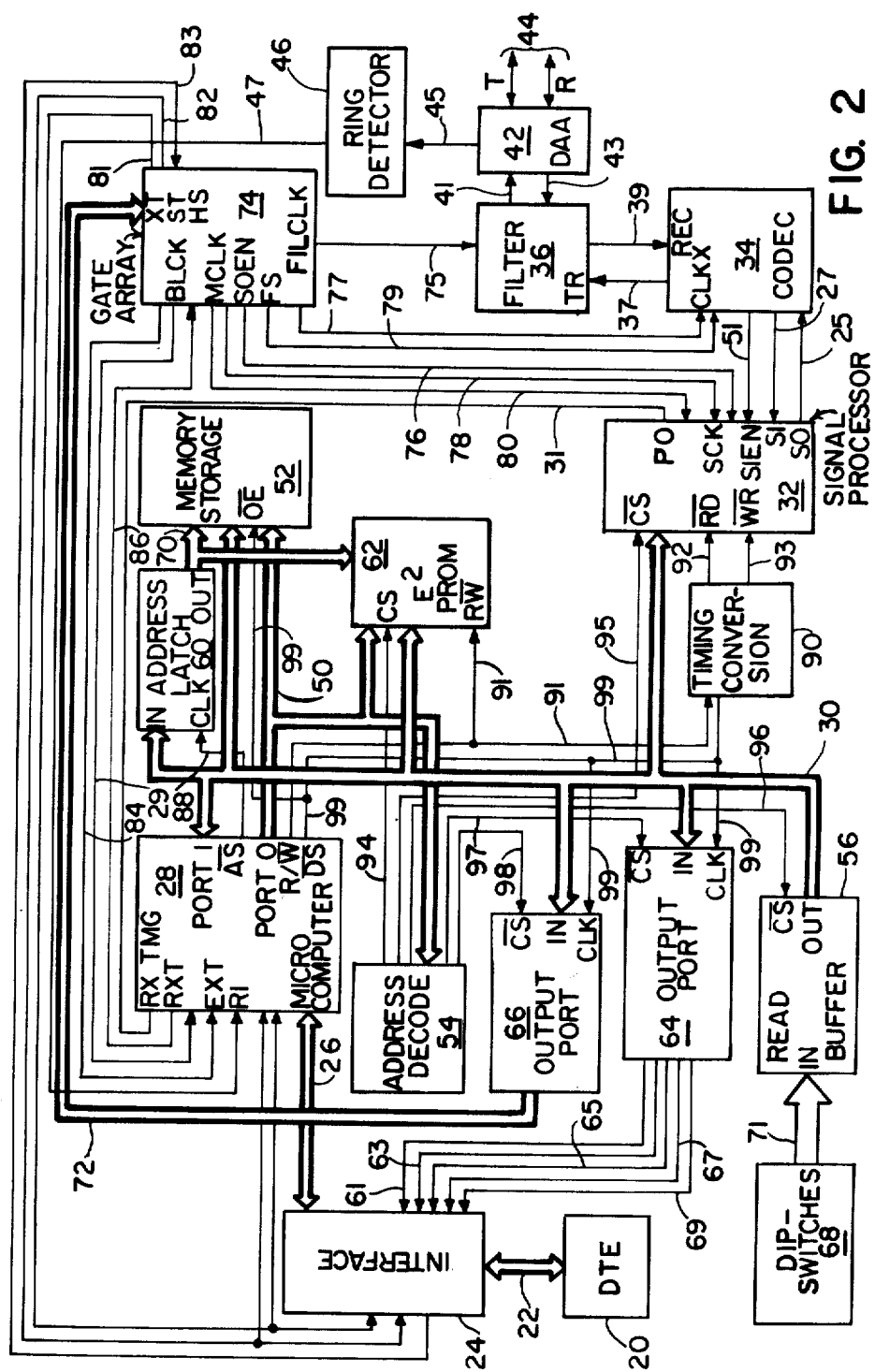
FIG. 2 is a block diagram of a preferred embodiment of the modem disclosing the preferred bus lines.

Referring now to FIG. 2, port 0 of microcomputer 28 is preferably coupled via a high order address bus 50 to program memory storage 52, to address decode means 54, and to electrically erasable programmable read only memory ($E^2$PROM) 62.

Port 1 of microcomputer 28 is preferably coupled via a low order address/data bus 30 to transmit digital data between read buffer 56, address latch 60, $E^2$PROM 62, program memory storage 52, signal processor 32 and output ports 64, 66.

Preferably, a plurality of dip switches 68 provide a means to manually select a variety of switch configurations for transmitting selected signals over bus 71 to read buffer 56.

Output port 64 is preferably configured to transmit a variety of digital data signals to interface 24, via lines 61, 63, 65, 67 and 69. Typical signals transmitted by lines 61, 63, 65, 67 and 69 include clear-to-send (CTS); data set ready (DSR); data carrier detector (DCD); high speed indicator (HS); and ring indication (RI). The HS signal also passes over line 120 to gate array 74. A logic low on the HS input indicates 2400 bps and a logic high indicates 1200 bps. The internally generated transmit clock rate is selected by the HS input.

A low order address bus 70 carries digital data from address latch 60 to program memory space 52 and to $E^2$PROM 62.

A timing control bus 72 provides control lines for high speed (HS); external timing (XT); and slave timing (ST) selection for the gate array 74. A logic low on the XT input and a logic high at ST indicates external timing mode. In external timing mode, TX TMG INT and BCLK are derived from DTE TX TMG and DCE TX TMG is inactive. A logic low on the ST input and a logic high at XT indicates slave timing mode. In slave mode, TX TMG INT and BCLK are derived from DCE RX TMG and DCE TX TMG is active. TX TMG INT output is used during synchronous mode to indicate when the transmit data from the DTE can be sampled. When in external timing mode, the TX TMG INT output is DTE TX TMG. When in slave timing mode, this output is DCE RX TMG. At all other times this output is derived internally.

Gate array 74 relays a clock signal over line 75 to filter 36. A clock signal is also transmitted from the gate array 74 to converting means 34 over line 77. A frame SYNC signal passes from gate array 74 to converting means 34 over line 79. The gate array 74 also provides serial output enable (SOEN); shift clock (SCLK); and master clock (MCLK) signals to signal processor 32 over lines 76, 78 and 80. The SOEN output is synchronous with FS and is used to initiate serial output data transfer from the digital signal processor (DSP). SOEN is held low during the 8 bit serial data transfer. Receive clock (RXC) and transmit (TXC) lines 81, 82 couple signals from gate array 74 to interface 24 and to microcomputer 28. External transmit clock (EXC) line 83 passes from interface 24 to gate array 74. Transmit timing (TX TMG) and baud clock (BCLK) are communicated over lines 84, 29 from gate array 74 to microcomputer 28. A received timing (RX TMG) line 86 transmits signals from microcomputer 28 to gate array 74.

(RTS), (DTR) and (TXD) signals pass to microcomputer 28 from interface 24 over bus 26.

An address strobe ($\overline{as}$) signal passes from microcomputer 28 to address latch 60 over line 88. A read/write signal is transmitted from microcomputer 28 to $E^2$PROM 62 and to timing conversion 90 over line 91.

Timing conversion 90 modifies the read/write interface signal, sending the read signal over line 92 to signal processor 32. The write signal is sent over line 93 from timing conversion 90 to signal processor 32. Timing conversion 90 also receives a clock signal in communication with microcomputer 28; output ports 64, 66; and program memory storage 52 over line 99.

Address decode 54 transmits a chip select ($\overline{cs}$) signal over line 94 to $E^2$PROM; over line 95 to signal processor 32; over line 96 to read buffer 56; over line 97 to output port 64; and over line 98 to output port 66.

A more detailed explanation of the circuitry is shown in schematic diagram, FIG. 3. Microcomputer 28 is preferably a microchip, such as a Zilog model Z8 microcomputer.

The signal processor 32 is preferably a microchip such as Model 7720 signal processor, manufactured by Nippon Electric Co., Ltd. (NEC).

The read buffer 56 is preferably a microchip such as model LS244 manufactured by Texas Instruments (TI).

Output ports 64, 66 are preferably microchips such as Model LS374 manufactured by TI.

The address decode 54 is preferably a microchip, such as model LS138, manufactured by TI.

The gate array 74 is preferably a microchip, such as CTS828-GA-016, manufactured by NEC.

The $E^2$PROM 62 is preferably a microchip, such as Model 2804 manufactured by Exel Corporation.

The program memory 52 is preferably a microchip, such as Model 2764 manufactured by American Micro Devices (AMD).

The address latch 60 is preferably a microchip such as Model LS374 manufactured by TI.

The converting means 34 is preferably a coder/decoder such as Model 2913 manufactured by Intel Corporation and commonly referred to as a codec.

The filter 36 is preferably a microchip, such as Model 35212 manufactured by American Microsystems, Inc. (AMI).

These microchips are shown in FIG. 3 with their associated interconnections. For clarity, the power and ground connections to these microchips have not been shown, as these connections are well known to those skilled in this art. Bus lines are referenced by a dashed loop for ease of illustration.

In the preferred embodiment, dip switch network 68 is configured to selectively control the following functions: word length; U.S.A. or European characteristics; auto answer enable; synchronous or asynchronous operation; RTS enable; EX TX timing; and SL TX timing.

Signals from dipswitch 68 pass through coupler 71 to read buffer 56 where the data is latched until read by microcomputer 28 over bus 30. Typically, pull up resistors (not shown) are used in conjunction with dip switch 68 and are well known to this art. Digital data from the read buffer passes through bus 30 to microcomputer 28 port 1.

A high order address bus 50 from port $\phi$ of microcomputer 28 links microcomputer 28 with program memory 52, $E^2$PROM 62, and address decode 54.

A low order address bus 70 extends from address latch 60 to program memory 52 and to E²PROM 62, as previously noted.

Microcomputer 28 may be adapted to internally generate a timing signal, or a timing signal may be generated by an external clock. Alternatively, a timing signal may extend from the gate array OSC and Clock 73 to microcomputer 28, or the timing signal may be supplied from a remote source external to the modem.

Microcomputer 28, signal processor 32 and gate array 74 may be driven by an associated clock source, such as 73 or 100, or may share a common clock source, or may be driven by an external clock source.

A read/write signal travels from microcomputer 28 over line 101 to pin 13 of inverting amplifier 102, such as model LS04 manufactured by TI. Line 101 also extends to pin 10 of OR gate 104, such as LS32 manufactured by TI. Pin 12 of inverting amplifier 102 extends over line 103 to pin 13 of OR gate 104. Pin 12 of OR gate 104 is connected to pin 9 of OR gate 104 by line 105. Line 105 also extends to program memory 52, microcomputer 28, to pin 4 of OR gate 104, and to pin 2 of OR gate 104. Pin 11 of OR gate 104 provides an output enable signal (OE) over line 107 to E²PROM 62 and to signal processor 32. Pin 8 of OR gate 104 extends over line 109 to E²PROM 62 and to signal processor 32.

Line 111 extends from address decode 54 to pin 1 of OR gate 104. Pin 3 of OR gate 104 extends over line 113 to output port 64. Pin 5 of OR gate 104 is connected to address decode 54 by line 115.

A (RST) signal from gate array 74 is connected by line 117 to microcomputer 28 and through inverting amplifier 102, pins 5 and 6, to signal processor 32. Pin 9 of inverting amplifier 102 connects to microcomputer 28 and to address decode 54 over line 106. Pin 8 of inverting amplifier 102 connects to program memory 52 over line 108.

Pin 6 of OR gate 104 connects to output port 66 over line 110.

Pull up resistors 112, such as shown on lines 114, 116, 118 are not shown everywhere used, as their location, purpose and use are will known in the art. Line 114 communicates a SIEN signal between signal processor 32 and converting means 34. Line 116 communicates a (SI) serial input signal between signal processor 32 and converting means 34. Line 118 communicates a serial output (SO) signal between signal processor 32 and converting means 34.

A chip enable (CE) signal is communicated over line 96 between read buffer 56 and address decode 54.

An address strobe signal is communicated over line 88 between microcomputer 28 and address latch 60.

A chip select (CS) signal is communicated between address decode 54 and signal processor 32 by line 121. Line 31 communicates a Pφ signal between signal processor 32 and microcomputer 28.

Lines 122, 123 transmit BCLK and RX SYNC signals between microcomputer 28 and gate array 74. A TX TMG INT signal is communicated over line 124 between microcomputer 28, interface 24 and gate array 74.

DTE TX TMG, DCE TX TMG and DCE RX TMG signals travel over lines 125, 126, 127 between gate array 74 and interface 24. DCE RX TMG is the receive timing clock used for indicating to the DTE when receive data can be sampled during synchronous mode. The high to low transition of this clock is in sync with the RX SYNC pulse. A 48.3%±2% duty cycle is maintained for either 1200 Hz or 2400 Hz bit rate.

DTE TX TMG input clock is used for inputting transmit timing from the DTE 20 when in external timing. It indicates to the data communication equipment (DCE) when transmit data from the DTE 20 can be sampled.

DCE TX TMG output is used to indicate to the DTE 20 when new transmit data can be sent to the DCE. This signal is derived during synchronous mode from the internally generated 1200 Hz and 2400 Hz clocks; or it is derived from DCE RX TMG when in slave timing mode. It is inactive in external timing and asynchronous modes.

ASYNC, ST and XT signals are communicated over lines 128, 129 130 between output port 66 and gate array 74. Lines 131, 132 link gate array 74 to OSC and Clock 73. A logic low on ASYNC input indicates asynchronous mode and therefore BCLK and TX TMG INT are derived from the internal transmit timing clock.

SCLK, MCLK, and SOEN signals travel over lines 133, 134, 135 between signal processor 32 and gate array 74. The SCLK is used for the DSP serial input/output clock. The MCLK output is used for the DSP master clock.

FS and CLKX signals are transmitted over lines 136, 137 between converting means 34 and gate array 74. CLKX output is used for the converting means 34 serial input/output clock. FS pulse output is used for initiating serial output data from the converting means 34 and for initializing clocking of data into the converting means 34.

Line 138 connects microcomputer 28 with pin 10 of inverting amplifier 102.

Line 139 connects output port 66 with filter 36.

Switching circuit 140, pins 9 and 11 communicate over lines 142, to output port 66. Pin 10 of switching circuit 140 is connected by line 141 to output port 66

A clock signal is communicated over line 143 between gate array 74 and filter 36.

Lines 144, 145 couple transmit and receive signals between filter 36 and DAA interface 42.

Line 146 transmits a signal between converting means 34; pin 13 of switch circuitry 140 and filter 36.

Line 147 supplies a signal between converting means 34 and pin 4 of switch circuitry 140.

Filter 36 is in communication with pins 1 and 12 of switching circuit 140 over line 148.

RX OUT signal is transmitted between filter 36 and pin 2 of switching circuit 140 over line 149. A RX signal is transmitted between filter 36 and pin 3 of switching circuit 140, over line 150.

A resistor and capacitor each bridge lines 145 and 150. Line 151 connects filter 36 with pin 14 of switching circuit 140. A resistor bridges lines 151 and 144, as shown in FIG. 3D.

Pin 15 is connected with pin 5 of switching circuit 140 over line 152. Pin 11 of inverter amplifier 102 connects to the ring detector circuit 46 over line 153. Lines 154, 155 connect the ring detector circuit 46 to DAA interface 42.

Figure 3A:
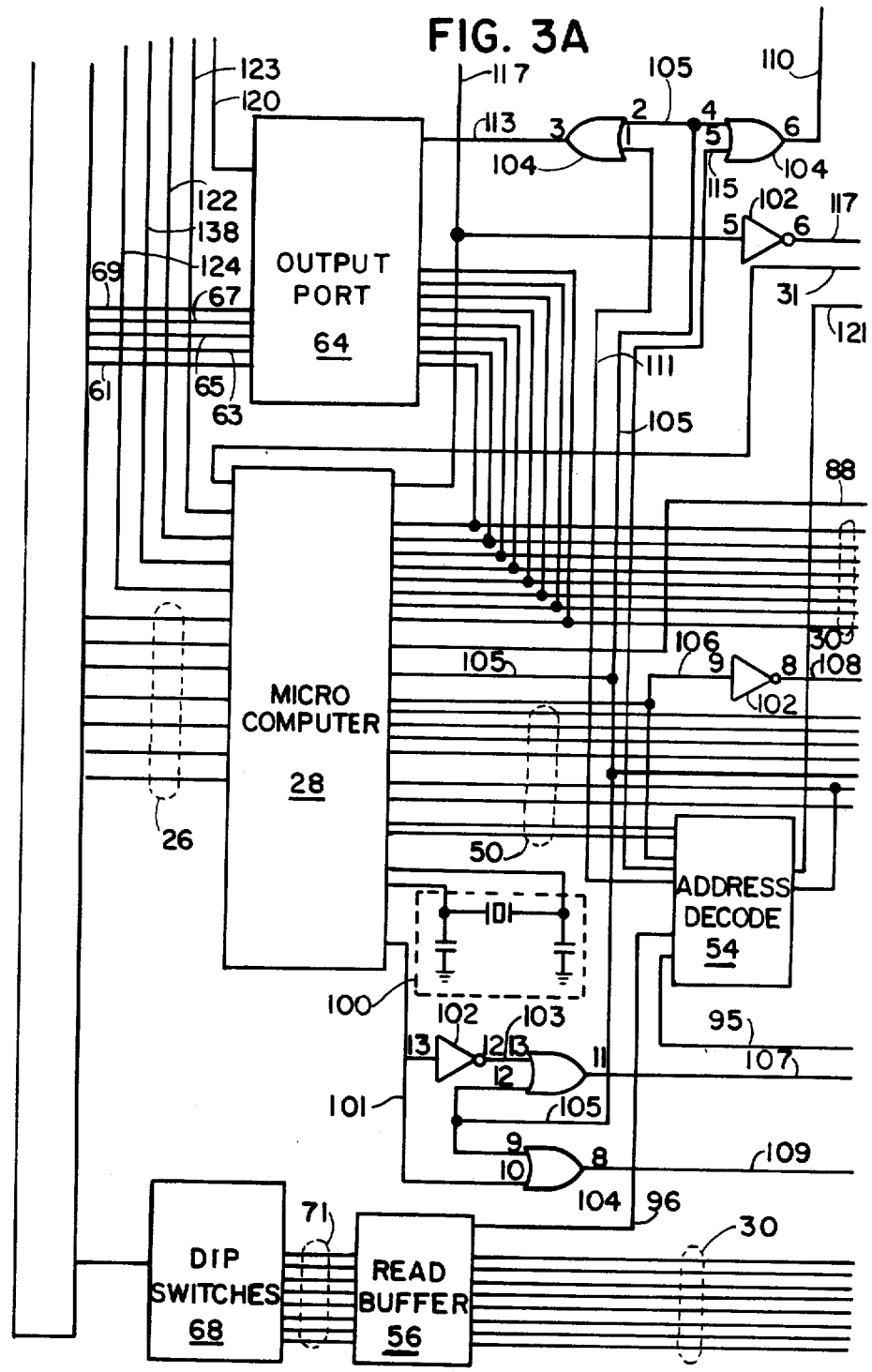
FIG. 3A-D is a schematic of the preferred embodiment of the modem.
Figure 3B:
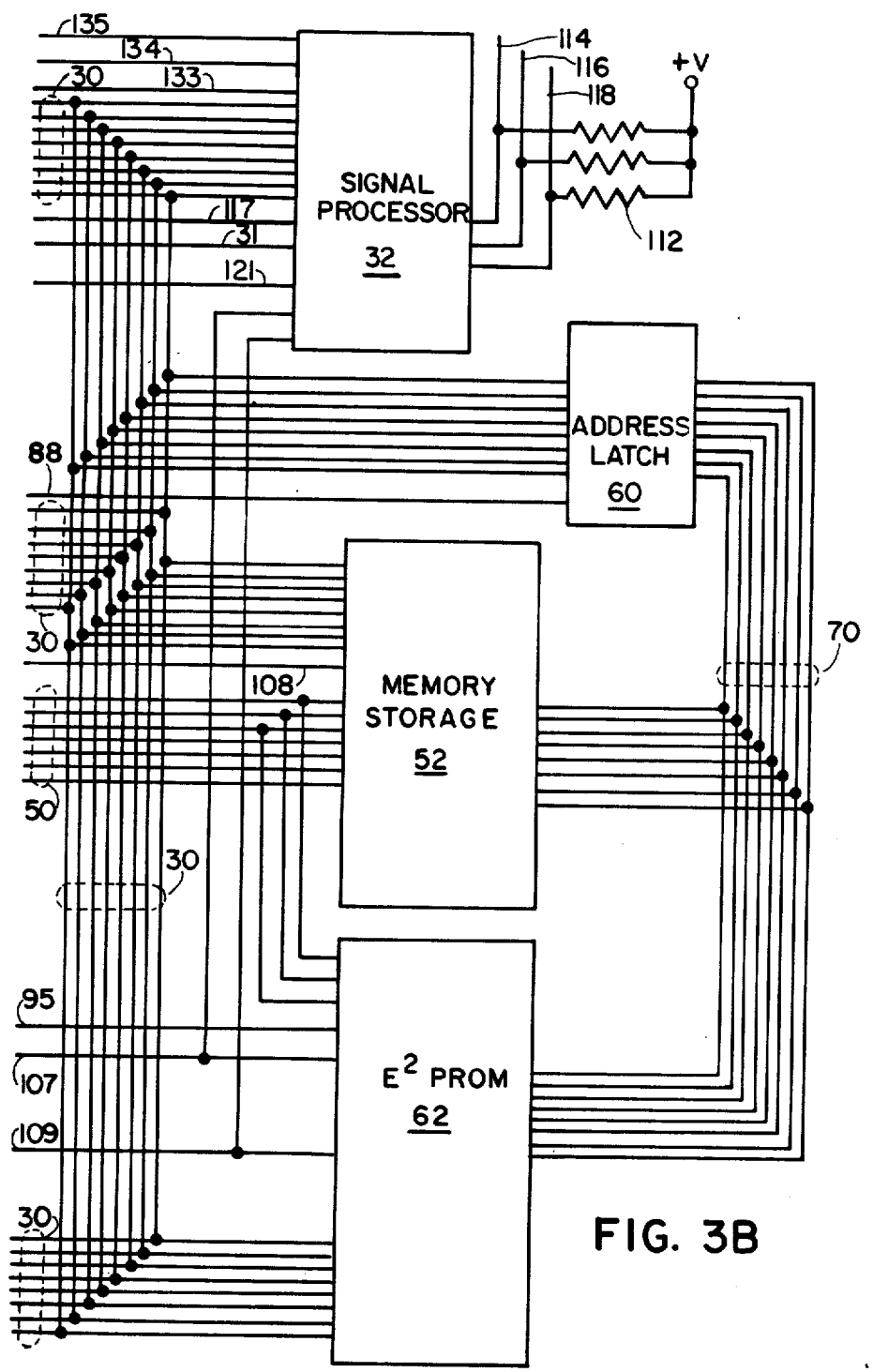
Figure 3C:
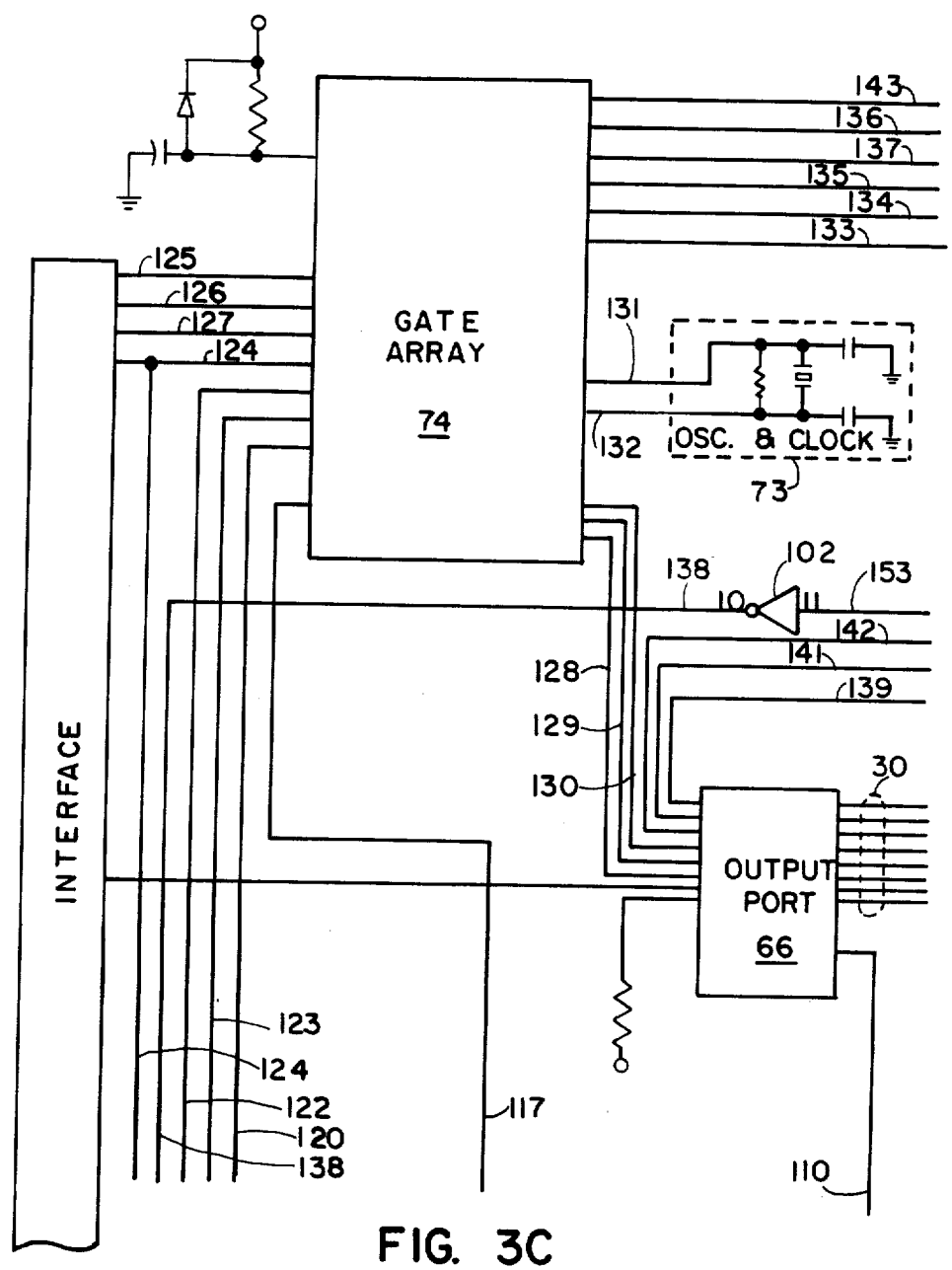
Figure 3D:
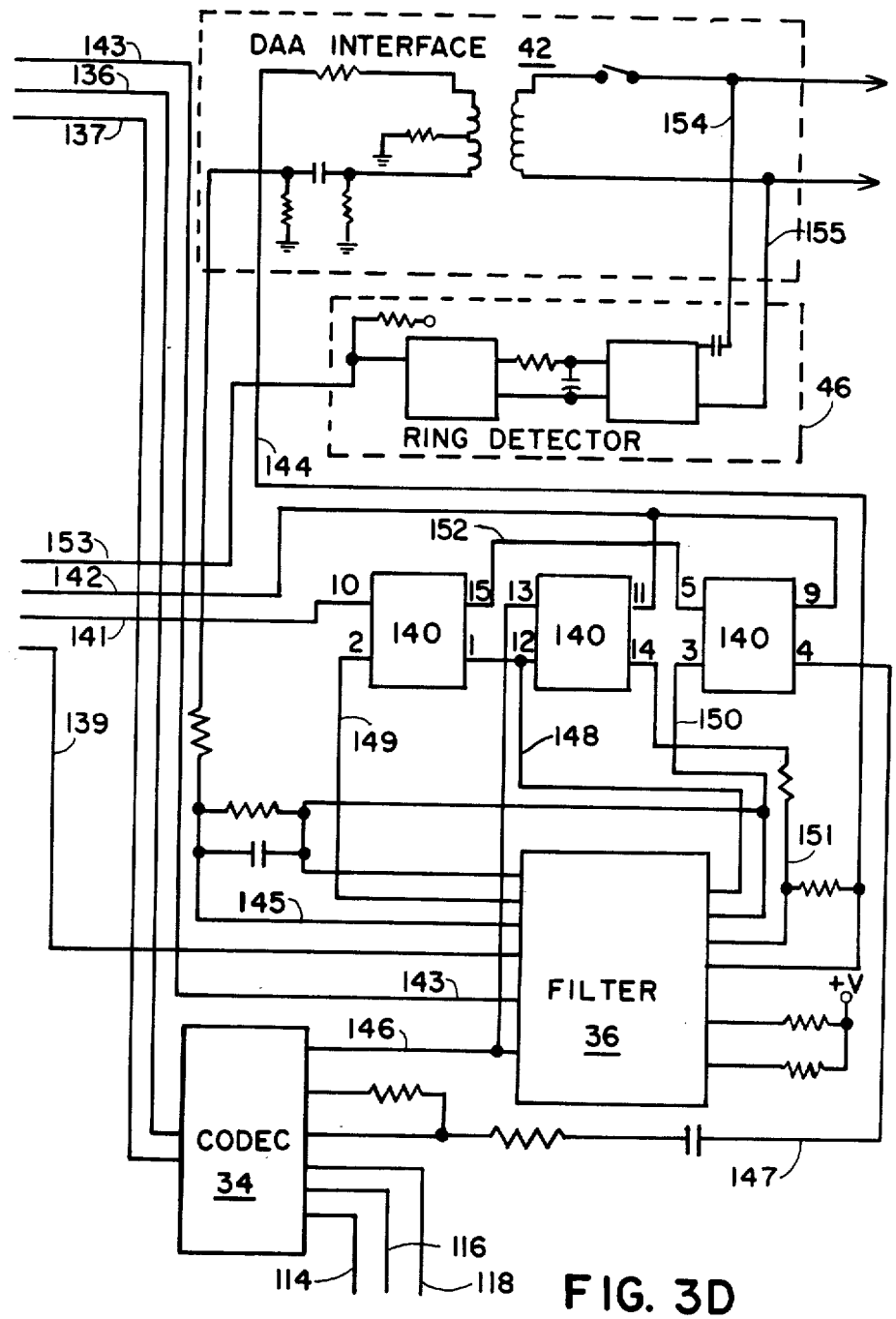

The schematic shown in FIG. 3D discloses a typical ring detector 46 and DAA interface circuitry 42 of a type known to one skilled in this art.

The preferred system configuration of the originate modem 10 and the answer modem 12 is shown in block diagram, FIG. 4. DTE 20 is coupled to microcomputer 28 in transmit direction 21. Interface 24 shown in FIG.

1 and 2 is preferably an RS232c interface. Bi-directional bus 30 transmits digital data between microcomputer 28 and signal processor 32. Digital data from signal processor 32 is transmitted over line 25 to the D/A portion 33 of the converting means 34.

The D/A 33 converts the digital data for transmission to an analog signal, which travels over line 37 to filter 36. Filter 36 preferably comprises a transmit filter 38 portion and receive filter 40 portion.

The analog signal from line 37 passes through transmit filter 38 for transmission over telephone network 44. The analog signal from originate modem 10 passes through receive filter 40 of answer modem 12 and over line 39 to A/D converter 35. The A/D converter 35 converts the analog signal to digital data for transmission over line 27 to signal processor 32. The digital data then travels over bus 30 to microcomputer 28. Digital data from microcomputer 28 is transmitted in direction 23 to DTE 20.

Answer modem 12 may simultaneously communicate with originate modem 10. DTE 20 sends digital data in direction 21 to microcomputer 28, over bi-directional bus 30 to signal processor 32 and over line 25 to D/A converter 33. The D/A 33 converts the digital data to an analog signal, which is transmitted over line 37 to transmit filter 38, then over telephone network 44 to originate modem 10.

The analog signal from answer modem 12 then passes through receive filter 40 and line 39 to A/D converter 35, where the analog signal is converted to digital data. The received digital data is then transmitted over line 27 to signal processor 32. The digital data is then transmitted over bi-directional bus 30 to microcomputer 28, where the processed digital data is transmitted in direction 23 to DTE 20. Thus, a full duplex modem is disclosed, for simultaneous transmission by both originate 10 and answer 12 modems over a conventional telephone network 44.

As shown in FIG. 4, there are four modes of operation: FSK, PSK, QPSK and QAM. FSK (frequency shift keying) mode is compatible with U.S.A. telephone transmission specifications (such as Bell 103 and 212), at any data rate from 0–300 b.p.s. Modem commands and messages are preferably transferred at 300 or 110 b.p.s. Transmit data from the DTE is sampled at 3200 Hz and sent from the microcomputer 28 to signal processor 32 for modulation. Coherent FSK signals from originate modem 10 are digitally synthesized and sent to D/A 33 for conversion to an analog signal for transmission through transmit filter 38 over telephone network 44 to answer modem 12 at 300 b.p.s.

The received FSK from answer modem 12 is filtered 40, then converted from an analog signal to digital data by A/D 35 and sent to the signal processor 32 for demodulation. Received data and carrier detect data are transferred from signal processor 32 to microcomputer 28 over bi-directional bus 30 at 3200 Hz and updated on interface 24 to DTE 20.

The DPSK (differential phase shift keying) mode of operation is compatible with European telephone transmission specifications (CCITT v.22, modes iii and iv).

When originate modem 10 transmits digital data from DTE 20 at 600 b.p.s., the digital data is converted from asynchronous to synchronous (if necessary), and the digital data is scrambled by scrambler software located within microcomputer 28. Scrambled data is sent by microcomputer 28 to signal processor 32 as bits at 600 baud for modulation. Binary PSK is digitally synthesized by the signal processor 32 and transmitted to D/A 33 for conversion to an analog signal and filtered 38 for transmission over telephone network 44 at 600 b.p.s.

Received DPSK signals are filtered 40, then converted from analog signals to digital data by A/D 35 and sent to signal processor 32 for demodulation. Receive data is transferred as bits along with carrier detect and signal quality information at 600 baud over bi-directional bus 30 to microcomputer 28 at intervals controlled by the timing recovery. Once received by the microcomputer 28, the data is descrambled with descrambler software located within microcomputer 28. Missing stop bits are reinserted (if necessary) and transferred over interface 24 to DTE 20.

The QDPSK (quaternary differential phase shift keying) mode of operation is compatible with the U.S.A. specification (Bell 212) and European specification (CCITT v.22 bis modes i and ii).

Transmit data from DTE 20 is converted from asynchronous to synchronous (if necessary) and sent at 1200 b.p.s. to microcomputer 28. Data is scrambled by scrambler software in microcomputer 28 and sent to signal processor 32 as dibits at 600 baud over bi-directional bus 30 for modulation. The QDPSK signal is digitally synthesized by signal processor 32 and sent to D/A 33 for conversion to an analog signal. The analog signal passes through filter 35 prior to transmission over telephone network 44 at 1200 b.p.s.

The received QDPSK 1200 b.p.s. analog signal is filtered 40, then converted to digital data by A/D 35 and sent to signal processor 32 for demodulation. Receive data is transferred as dibits along with carrier detect and signal quality information at 600 baud over bi-directional bus 30 to microcomputer 28 at intervals controlled by the timing recovery. The digital data is then descrambled with descrambler software in microcomputer 28. Missing stop bits are reinserted (if necessary) and the descrambled digital data phases through interface 24 to DTE 20.

The QAM (quadrature amplitude modulation) mode of operation is compatible with European specification (CCITT v.22 bis).

Transmit data from DTE 20 is sent at 2400 b.p.s. to microcomputer 28 and converted from asynchronous to sychronous (if necessary). Digital data is scrambled by scrambler software in microcomputer 28 and sent as quadbits at 600 baud to signal processor 32 over bi-directional bus 30 for modulation. The QAM signal is digitally synthesized by signal processor 32 and sent to D/A 33 for conversion to an analog signal. The analog signal passes through filter 35 prior to transmission over telephone network 44 at 2400 b.p.s.

The received QAM 2400 b.p.s. signal is filtered 40, then converted to digital data by A/D 35 and sent to signal processor 32 for demodulation. Receive data is transferred as quadbits along with carrier detect and signal quality information at 600 baud over bi-directional bus 30 to microcomputer 28 at intervals controlled by the timing recovery. The digital data is then descrambled with descrambler software in microcomputer 28. Missing stop bits are reinserted (if necessary) and the descrambled digital data passes through interface 24 to DTE 20.

The modem shown in FIG. 5 may simultaneously transmit and receive an analog signal over telephone network 44, in any of the multispeed modes disclosed herein. The transmit and receive speeds are determined by the originate modem. The answer modem of the present invention will respond to the originate modem's mode.

In the preferred embodiment, there are four methods of entering the answering mode: by auto answer from idle state; by auto answer from command state; by manual answer from command state ('A' command); and by manual answer from idle state using the RTS signal. The modem switches to synchronous operation (if necessary) following and answer mode protocol.

In the preferred embodiment, there are four methods of entering the originate mode; by auto dialing from command state ('D' command); by auto dialing from the idle state using RTS (not leased line); by manual originate from idle state using RTS (leased line); and the manual originate from command state ('O' command). The modem switches to synchronous (if necessary) following the originate mode protocol.

Where leased line is selected for entering the originate or answer mode, protocol is bypassed and a scrambled mark is transmitted. In all cases from idle state, synchronous mode is selected by dip switch 68. In all cases from command state, synchronous mode is selected by the ('I') command.

The call progress tone detection mode is capable of detecting all standard and most non-standard call progress tone pairs. The analog signal tones are converted to digital data by A/D 35 and sent to the signal processor 32 where they are passed through two discriminators. The first discriminator distinguishes between call progress tones and answer tones, while the second discriminator differentiates between U.S.A. answer tones (2225 Hz) and European answer tones (2100 Hz). The carrier detector is used to declare the presence of a valid signal level.

Three one-bit outputs corresponding to the carrier detector and two discriminator signals appear on bi-directional bus 30 in the receive data word sent from signal processor 32 to microcomputer 28. The microcomputer 28 examines the three bits to determine the presence of a U.S.A. answer tone, a European answer tone, a call progress tone pair, or no tone. Various call progress tones are distinguished by their tone repetition frequency and pattern.

In the preferred embodiment, dial tones are distinguished at frequencies of 350/440 and 525/660 with a steady pattern. Busy tones are distinguished at a frequency of 480/620 with a 0.5 sec. on/0.5 sec. off patern. Reorder tones are distinguished at a frequency of 480/620, with a 0.25 sec. on/0.25 sec. off pattern. Ringbacks are distinguished at a frequency of 440/480 with a pattern of 1 sec. on/3 sec. off, or 2 sec. on/4 sec. off. Coded ringbacks may be distinguished at a frequency of 440/480 with a pattern of 0.5 sec. on/0.5 sec. off/0.5 sec. on/2.5 sec. off. Call progress tones preferably have a sensitivity of −7 to −45 dBm.

FIG. 6 is a block diagram of the DTMF system configuration. As shown in FIG. 6 an ASCII phone number passes from DTE 20 to microcomputer 28. The phone number is transmitted as a 4 bit hex at 600 Hz over bi-directional bus 30 to signal processor 32. The digital data then passes through D/A 33 where it is converted to an analog signal for transmission over phone network 44. All 16 DTMF tone pairs may be generated in the DTMF tone generation mode. Preferably, the continuous tone pair is transmitted at −5 dBm with 2 dB amplitude balance and less than one percent frequency deviation.

Microcomputer 28 translates the telephone number digits entered at DTE 20 from ASCII to the 4 bit hex code recognized by signal processor 32. Microcomputer 28 also controls the done duration and interdigit delay. The signal processor 32 then uses the 4 bit hex codes to select the frequencies to be digitally synthesized and sent to D/A 33 for conversion to analog signals. The preferred frequencies selected by the signal processor are shown in Table 1.

TABLE 1

| ROW | C1 | C2 | C3 | C4 | FREQUENCY |
|---|---|---|---|---|---|
| R1 | 1 | 2 | 3 | A | 697 Hz |
| R2 | 4 | 5 | 6 | B | 770 Hz |
| R3 | 7 | 8 | 9 | C | 852 Hz |
| R4 | * | 0 | # | D | 941 Hz |
| Frequency | 1209 Hz | 1336 Hz | 1477 Hz | 1633 Hz | |

Referring now to FIG. 7, the line status detector is shown in block diagram form. The answer tone or line status tone received over telephone line 44 proceeds directly to A/D 35 without passing through filter 40. The analog signal is converted by A/D 35 to digital data and sent over line 27 to signal processor 32, for conversion to 3 bit logic transferred over bi-directional bus 30 to microcomputer 28, for transfer of a suitable message from microcomputer 28 to DTE 20.

Figure 9:
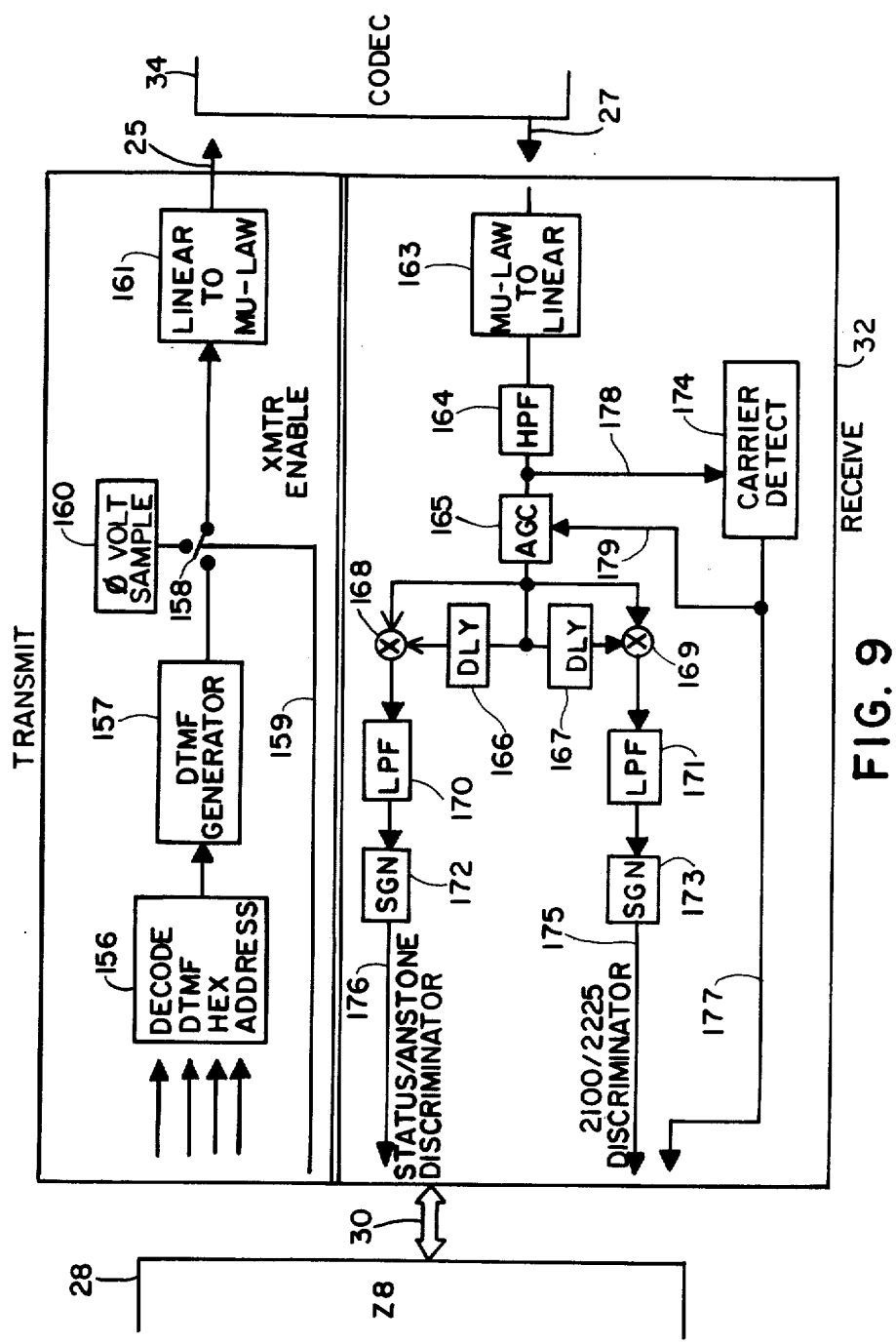
FIG. 9 is a block diagram of the signal processor in DTMF/line status mode.

Referring now to FIG. 9, the DTMF line status mode of the signal processor 32 is shown in block diagram form. Digital data from microcomputer 28 travels over bi-directional bus 30 to an internal decode DTMF hex address 156 located within signal processor 32. The digital data from the DTMF hex address is processed through a DTMF generator 157 to a transmitter enable switch 158. Switch 158 is controllably positioned by a transmitter enable signal from line 159. Switch 158 is selectively positioned to pass a signal from the DTMF generator 157 or φ volt sample 160, to linear to MU-LAW converter 161. The digital data signal from converter 161 passes over line 25 to D/A 33 for conversion to an analog signal for transmission as previously disclosed.

A receive signal is converted by A/D 35 to digital data as previously disclosed and sent over line 27 to a MU-LAW to linear converter 163 located within signal processor 32. The converted linear signal passes through an internal high pass filter (HPF) 164 to the automatic gain control (AGC) 165. AGC 165 sends a linear signal to delay circuits 166, 167 and to multipliers 168, 169. The signal from delay circuit 166 is sent to multiplier 168 for auto-correlation with the RX signal from AGC 165. The correlated signal then passes through a low pass filter (LPF) 170 to sign decision (SGN) 172. The SGN 172 then supplies indication of either a status signal or an answer tone signal from signal processor 32 over bi-directional bus 30 to microcomputer 28. The signal from HPF 164 is sent over line 178 to carrier detect 174. Output from carrier detect 174 is sent to AGC 165 over line 179, and to bus 30 over line 177.

Delay circuit 167 sends a signal to multiplier 169 for auto-correlation with the RX signal from AGC 165. The resulting signal passes through LPF 171 to SGN 173. SGN 173 then supplies indication of either a U.S.A. answer tone (2225 Hz) or a European answer tone (2100 Hz) over bus 30 to microcomputer 28.

Figure 8:
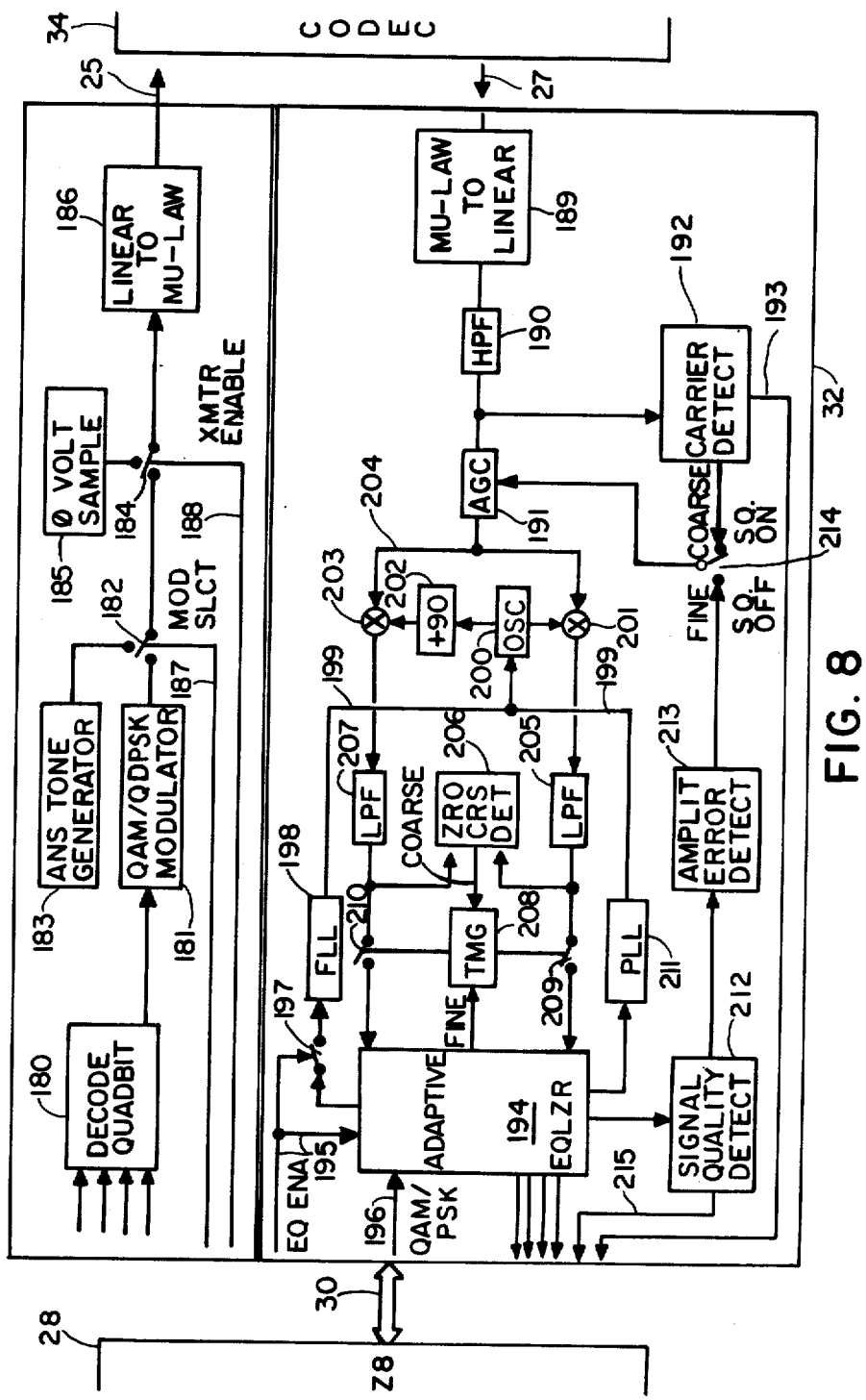
FIG. 8 is a block diagram of the signal processor in modem mode.

FIG. 8 shows a detailed view of the signal processor 32 portion of the modem block diagram in modem mode. The digital data from microcomputer 28 travels over bi-directional bus 30 to decode quadbit 180 located within signal processor 32. From decode quadbit 180 the digital data passes through a QAM/QDPSK modulator 181 to switch 182. Switch 182 is controlled by a mode select input 187 from microcomputer 28. Switch 182 is selectively positioned to transmit digital data from QAM/QDPSK modulator 181 or from an internal answer tone generator 183 to switch 184. Switch 184 is controlled by a transmitter enable input 188 from microcomputer 28. Switch 184 is selectively positioned to transmit the digital data from switch 182 or a $\phi$ volt sample 185 to a linear to MU-LAW converter 186. Digital data from converter 186 is then transmitted over line 25 to D/A 33 for conversion to an analog signal, as previously disclosed.

Digital data received from A/D 35 is transmitted over line 27 to an internal MU-LAW to linear converter 189 located within signal processor 32. The converted data passes through a high pass filter 190 to the automatic gain control 191 and to carrier detect 192. Output from carrier detect 192 is transmitted by line 193 to bi-directional bus 30.

Equalizer enable from microcomputer 28 is transmitted over bus 30 and line 195 to adaptive equalizer 194 located within microcomputer 32. QAM/QDPSK select is transmitted from bus 30 to adaptive equalizer 194 over line 196. The equalizer enable from line 195 controls switch 197. Switch 197 is selectively positioned to make or break the transmission of data from the adaptive equalizer 194 to the frequency lock loop 198. Data passing through the frequency lock loop 198 is transmitted by line 199 to an oscillator circuit 200. Data from oscillator circuit 200 is sent to correlator 201 and to a plus 90° phase shift 202. Data passing through 90° phase shift 202 is sent to correlator 203.

Data from automatic gain control 191 is also sent to correlator 201 and correlator 203 over line 204. Correlator 201 correlates data from oscillator 200 and automatic gain control 191 for transmission through a low pass filter 205 to a zero crossing detector 206 and to switch 209.

Correlator 203 correlates data from automatic gain control 191 and from 90° phase shift 202 for transmission through low pass filter 207 to zero crossing detector 206. The zero crossing detector 206 transmits coarse input data to a timing control 208.

Timing control 208 also receives fine input data from adaptive equalizer 194. Timing control 208 in turn controls switches 209, 210. When switch 209 is closed, the data signal passing through low pass filter 205 is transmitted to adaptive equalizer 194. When switch 209 is opened, the data signal from low pass filter 205 cannot be transmitted to adaptive equalizer 194. Similarly, when switch 210 is closed, the data signal from low pass filter 207 is transmitted to adaptive equalizer 194. When switch 210 is opened, the data signal from low pass filter 207 cannot be transmitted to adaptive equalizer 194.

The adaptive equalizer 194 also supplies data to phase locked loop 211. Data from phase locked loop 211 is sent over line 199 to oscillator 200.

Data is sent by adaptive equalizer 194 through signal quality detector 212 to amplitude error detector 213. Amplitude error detector 213 provides a fine AGC control signal to switch 214 labeled "SQ off." A coarse AGC control signal labeled "SQ on" is sent to switch 214 from carrier detect 192.

Depending upon the position of switch 214, either a "coarse" or "fine" AGC control signal is sent to automatic gain control 191.

Output from signal quality detector 212 is also sent to bus 30 over line 215. Received data from adaptive equalizer 194 is also sent as a quadbit over bus 30 to microcomputer 28.

Thus, as shown in FIG. 8, signal processor 32 modulates the transmitted data and demodulates the received signal.

Figure 10:
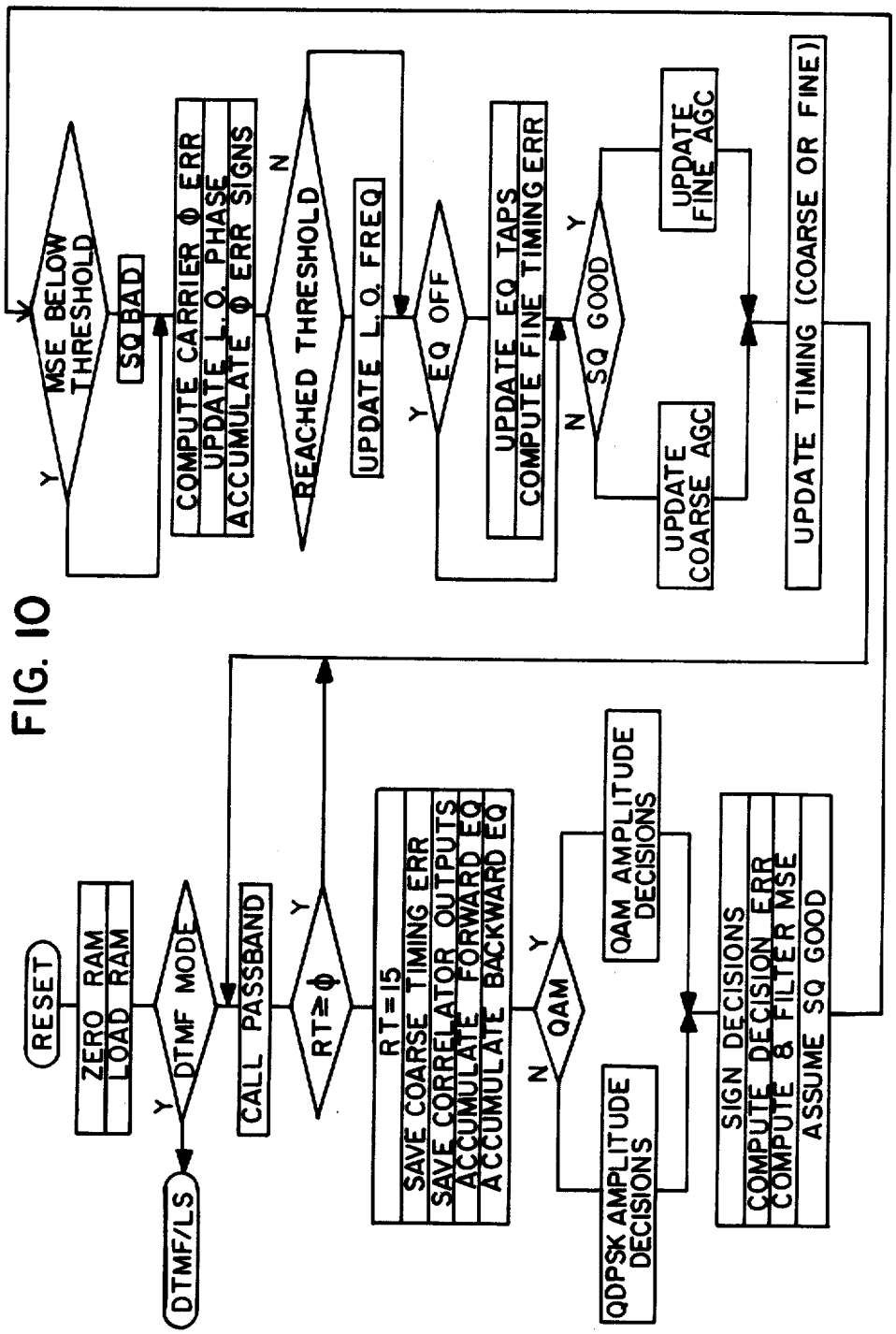
FIG. 10 is a flow chart of the preferred main modem program configuration.

FIG. 10 is a flow chart of the preferred main modem program configuration. Modem 10 is intitialized upon receipt of a mode configuring word from microcomputer 28. Next the RAM is zeroed by the signal processor 34. Then the RAM is loaded. If the DTMF/line status mode is selected, program flow passes to the DTMF/line status program shown in FIG. 11. If the DTMF/line status mode is not selected, then program flow passed to CALL PASSBAND. From CALL PASSBAND the program flow passes to the received timing (RT) decision block. If RT is equal to or greater than $\phi$ then the program is returned to CALL PASSBAND. If the RT is less than $\phi$, the program flow passes to RT=15. From RT=15, the coarse timing error is saved, the correlator outputs are saved, and the forward and backward equalizers are accumulated. The program flow then passes to the QAM decision block.

If the program flow is quadrature amplitude modulated, then QAM amplitude decisions are made. If the program flow is not QAM, then quaternary differential phase shift keying amplitude decisions are made. (Ref. FIG. 8).

In either case, the sign decisions are then made, followed by computation of decision error, and computing and filtering the mean squared error (MSE). The signal quality is assumed to be good.

The next decision concerns the MSE threshold. If the MSE is not below the threshold, then the signal quality is bad. The program flow is then sent to compute carrier phase error. If the MSE is below the threshold, then the signal passes directly to compute carrier phase error. Next, the local oscillator (L.O.) phase is updated, and the phase error signs are accumulated.

If the threshold is reached, the L.O. frequency is updated. If the threshold is not reached the L.O. frequency is not updated.

The next decision is equalizer enable. If the equalizer is enabled, then the equalizer taps are updated, and the fine timing error is computed.

The next decision is to determine if the signal quality (SQ) is good. If the prior decision determines that the EQ is off, then a decision is made to go directly to the SQ good decision. If the SQ is good, then the fine automatic gain control is updated. If the SQ is not good, then the coarse automatic gain control is updated.

Next the coarse or fine timing is updated, and the program flow is returned to call passband.

Thus FIG. 10 discloses how the modem selects between the modem mode and the DTMF/line status mode. FIG. 10 also discloses the means for determining and updating coarse or fine AGC for greater accuracy during high speed transmission between originate 10 and answer modems 12.

Figure 11:
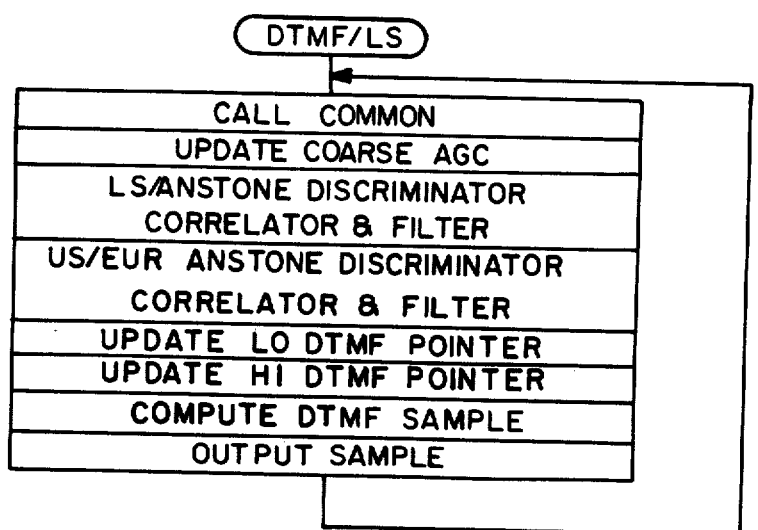
FIG. 11 is a flow chart of the preferred DTMF/line status program configuration.

Next FIG. 11 disclose the preferred DTMF/line status program configuration. The DTMF/line status program flow passes through call common; the coarse automatic gain control is updated; the line status/answertone discriminator, correlator and filter are updated; the U.S.A./European answer tone discriminator correlator and filter are updated; the low DTMF pointer is updated; the high DTMF pointer is updated; the DTMF sample is computed; and the output sample is generated. Program flow then passes back to call common.

Figure 12:
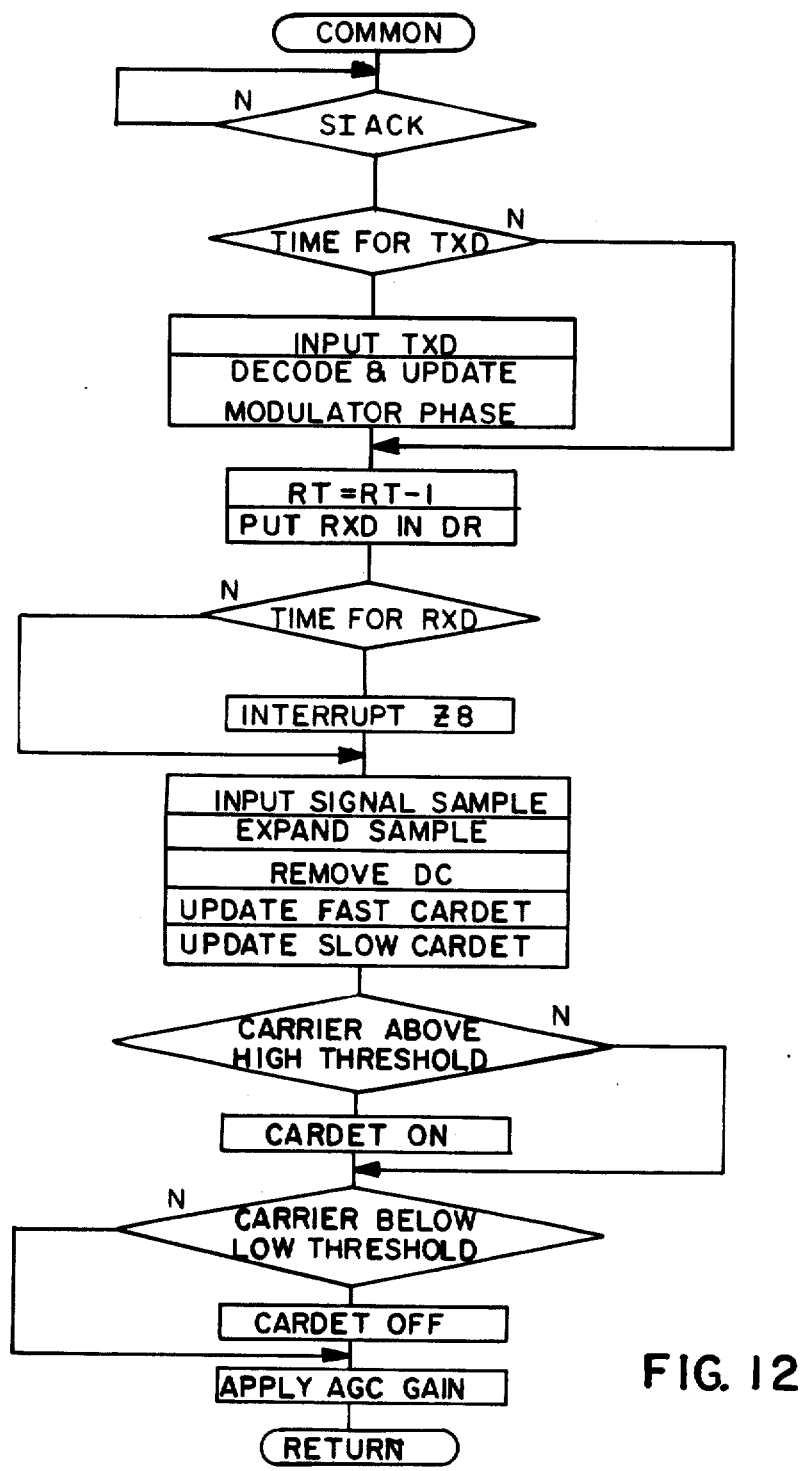
FIG. 12 is a flow chart of the preferred common pass hand configuration.

FIG. 12 discloses a flow chart showing the preferred common passband configuration. The first decision comprises serial input. The program waits for a serial input acknowledge before continuing to the time for TXD decision.

If the time for TXD is acknowledged, then the transmit data is inputted. Next, the transmit data is decoded and updates the modulator phase. Next the RT=T−1 is executed. If the time for TXD is not acknowledged, then the program flow goes directly to the RT=RT−1 step. Next the received data from modem (RXD) is transferred to the data register (DR).

Then the time for sending received data is determined. If it is time to receive data then the signal passes to interrupt microcomputer 28. If it is not time to receive data, then the microcomputer is not interrupted. In either case, the signal sample is inputted to the signal processor 32; the signal sample is expanded, and the direct current (DC) component is removed; the fast carrier detector (CARDET) is updated; and the slow CARDET is also updated.

Once the slow CARDET has been updated, the program flow passes to the carrier above high threshold decision block. If the carrier is above the high threshold, then the CARDET is turned on. In either event, the next decision is carrier below low threshold. If the carrier is below low threshold, then the CARDET is turned off. In either event, the program flow then passes to apply AGC gain. From AGC gain, the program flow is returned to the calling program.

Figure 13:
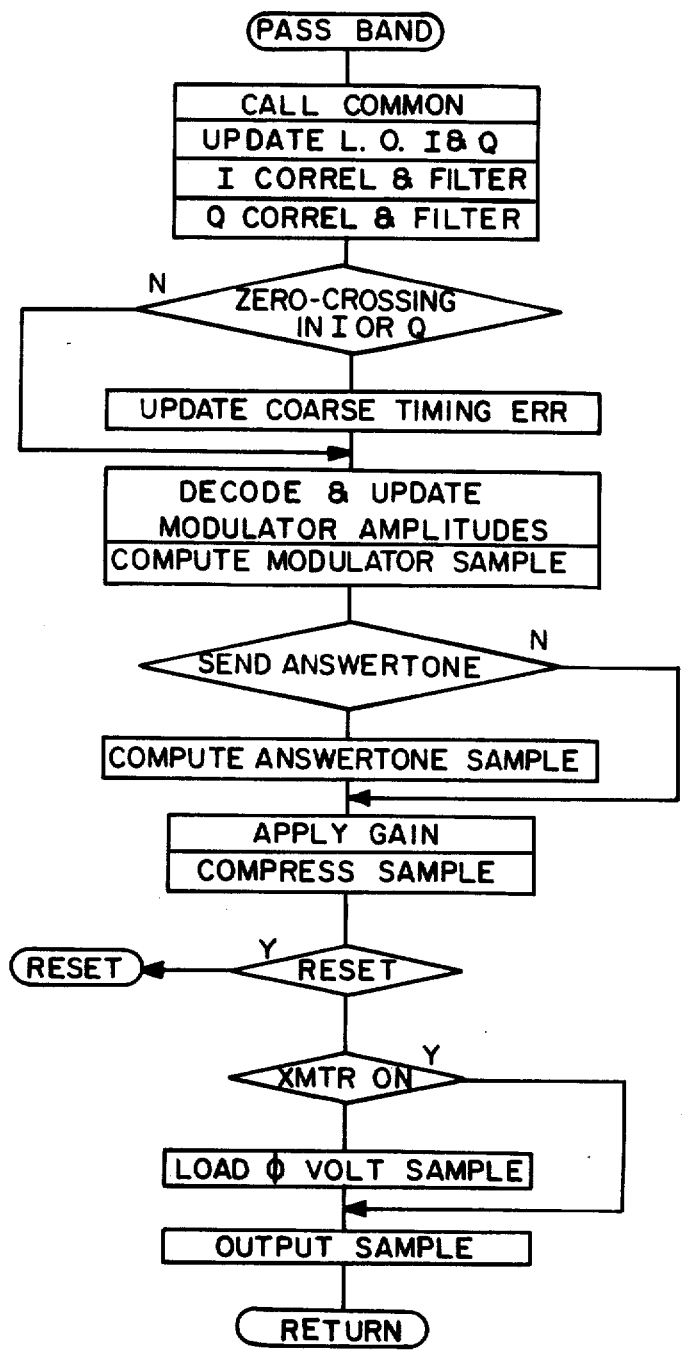
FIG. 13 is a flow chart of the preferred pass band configuration in modem mode.

Referring now to FIG. 13, the modem passband flow passes to call common, then update local oscillator in phase (I) and quadrature (Q). Next the I signal path is correlated and filtered, then the Q signal path is correlated and filtered.

Then the decision is made to determine if a zero-crossing has been made in the I or Q signal path. If a zero-crossing has occurred, then the coarse timing error is updated. In either event, the next step is to decode and update the modulator amplitudes, and to compute the modulator sample.

The next decision is to send an answer tone. If the decision is yes, then an answer tone sample is computed. If the send answer tone decision is no, then the answer tone sample is not computed. In either event, the next sequence is to apply gain to the resulting sample and to compress the sample.

Next, a decision is made to reset. If the decision is yes, then the modem program is reset. If the decision is no, then the next decision regards the transmitter. If the decision is not to turn the transmitter on, then the $\phi$ volt sample is loaded. If the decision is to turn the transmitter on, then the load $\phi$ volt sample is bypassed. In either event, the next step is to provide an output sample, and to return the program flow to the calling program.

Figure 14:
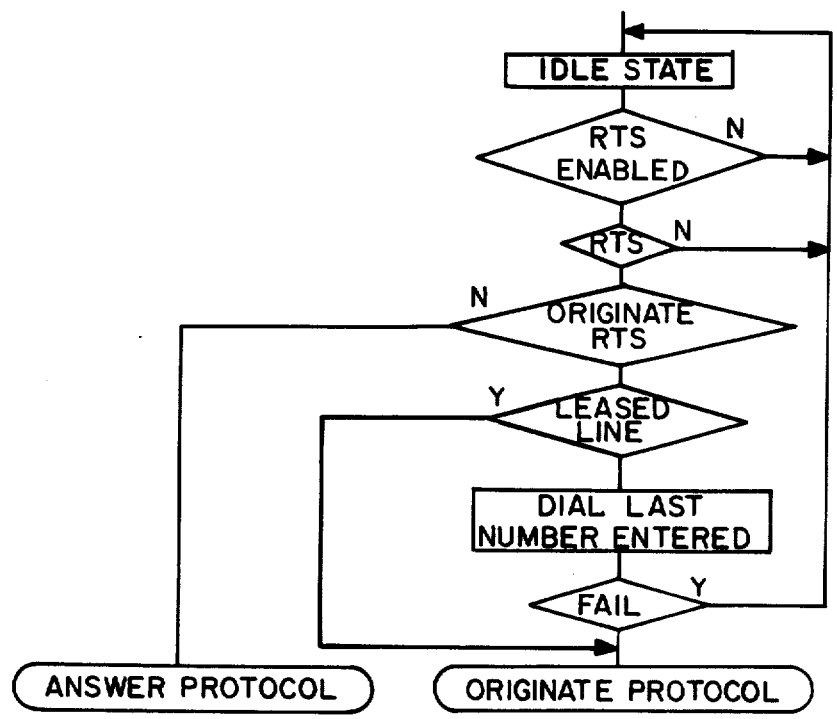
FIG. 14 illustrates a flow chart of the preferred embodiment of the RTS dial configuration.

Next, FIG. 14 shows a flow chart of the RTS dial configuration. The RTS dial program flow is sent to an idle state. If RTS is both enabled and present, the program then determines whether originate (RTS) or answer (RTS) was selected. If answer (RTS) was selected, program flow passes to answer protocol. If originate (RTS) was selected, the program determines if a leased line or dial-up line was selected. If a leased line was selected, the program flow passes to an originate protocol. If a dial-up line was selected, then the program dials the last telephone number entered.

If the call is completed, the program passes to originate protocol, otherwise the program returns to idle state.

Figure 15:
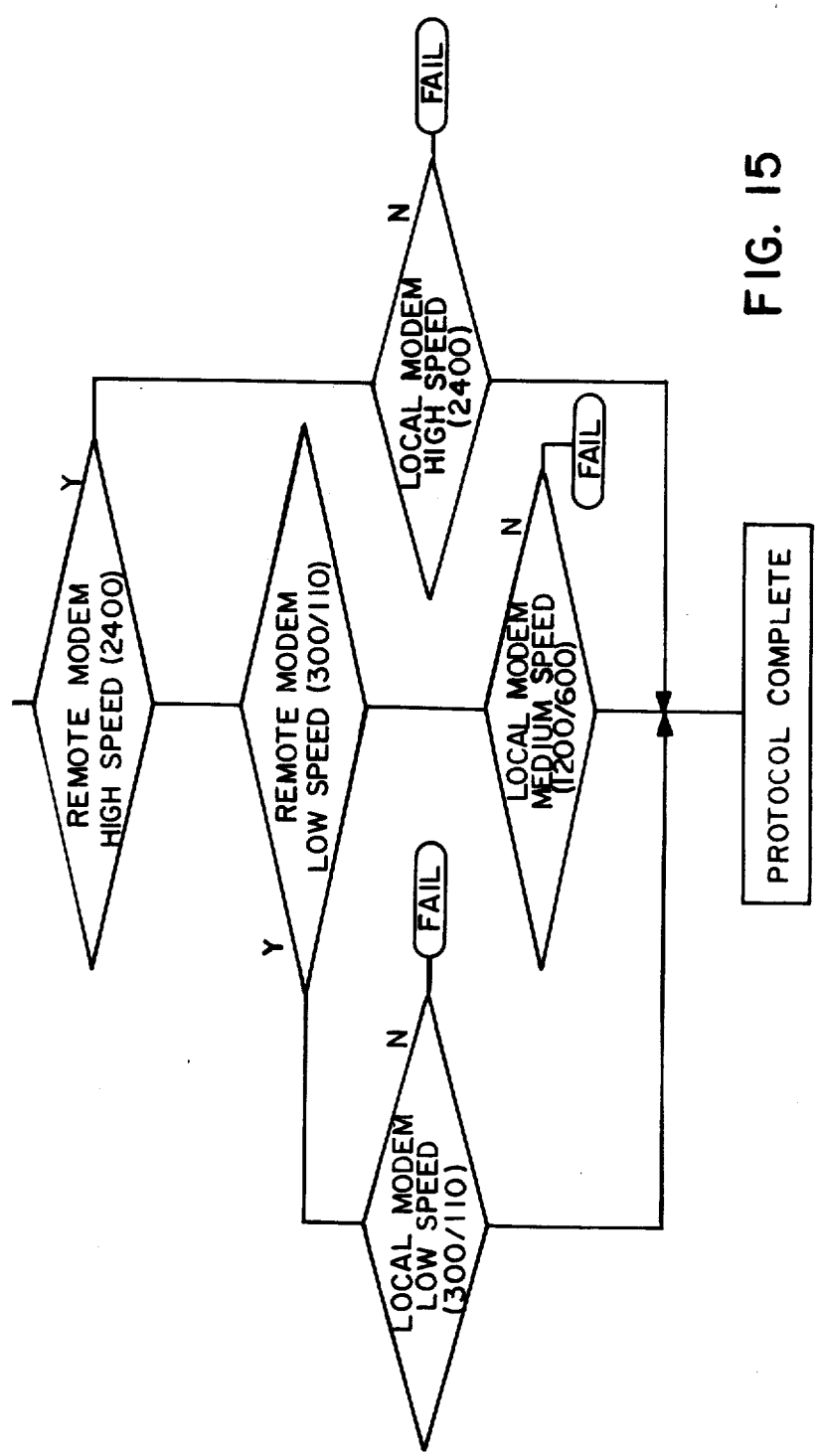
FIG. 15 illustrates a flow chart of the preferred embodiment of the forced baud rate configuration.

FIG. 15 discloses a flow chart of the forced baud rate option, wherein the digital data passes to a remote modem high speed (2400) decision block. If the remote modem is processing data at 2400 b.p.s., then the program flow is passed to the local modem at 2400 b.p.s. decision block. If the local modem is not at 2400 b.p.s, then protocol fails. If the local modem is at 2400 b.p.s., then the protocol is complete.

If the remote modem is not at 2400 b.p.s., then the program flow is passed to a remote modem low speed (300/110 b.p.s.) decision block. If the remote modem is at 300/110 b.p.s., then the program flow passes to the local modem low speed (300/110 b.p.s.) decision block. If the local modem is in low speed, then the protocol is complete. If the local modem is not in low speed mode, then protocol fails.

If the remote modem is not at high speed (2400 b.p.s.), and not at low speed (300/110 b.p.s.), then the program flow passes to local modem medium speed (1200/600) decision block. If the local modem is not (1200/600 b.p.s.), then protocol fails. If the local modem is at medium speed (1200/600 b.p.s.), then the program flow passes to protocol complete.

Figure 16:
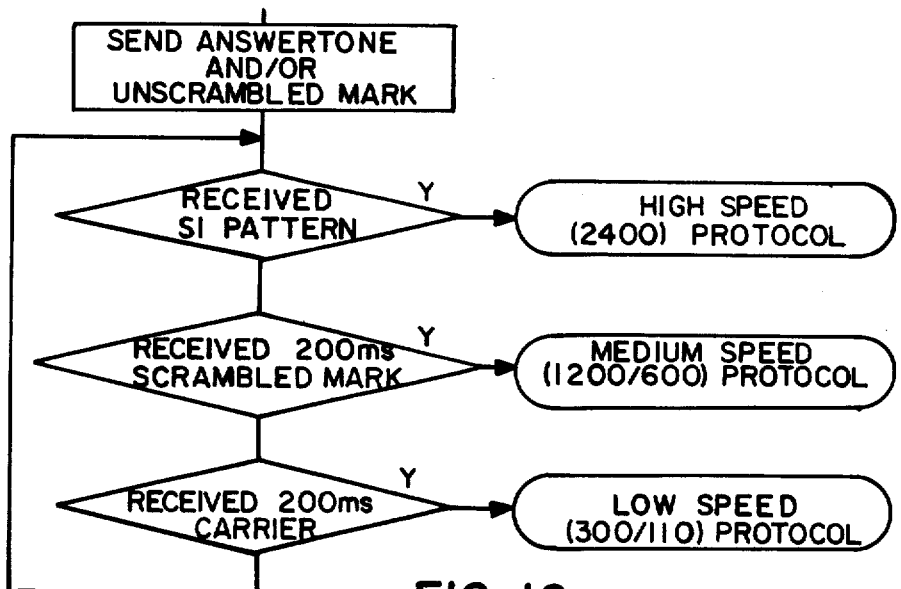
FIG. 16 illustrates a flow chart of the the preferred auto answer configuration.

FIG. 16 is a flow chart of the preferred auto answer configuration. The program flow is passed through a send answertone and/or unscrambled mark step, to a received S1 pattern decision. S1 begins 2400 b.p.s. high speed protocol. If the S1 pattern has been received, then the program flow passes to high speed protocol. If the S1 pattern was not received, then the program flow passes to a received 200MS scrambled mark decision. If the 200MS scrambled mark has been received, then the program flow passes to medium speed (1200/600 b.p.s.) protocol.

If the 200MS scrambled mark is not received, then the program flow pass to the received 200MS carrier decision block. If the 200MS of carrier has been received, then the program flow passes to low speed (300/110 b.p.s.) protocol. If 200MS carrier has not been received, then the program flow passes to the time to abort decision. If yes decisions have not been made within a specified time, such as 15 seconds, then the decision is made to abort auto answer protocol. If the specified abort time has not yet been reached, then the program flow returns to the received S1 pattern decision block.

Figure 17:
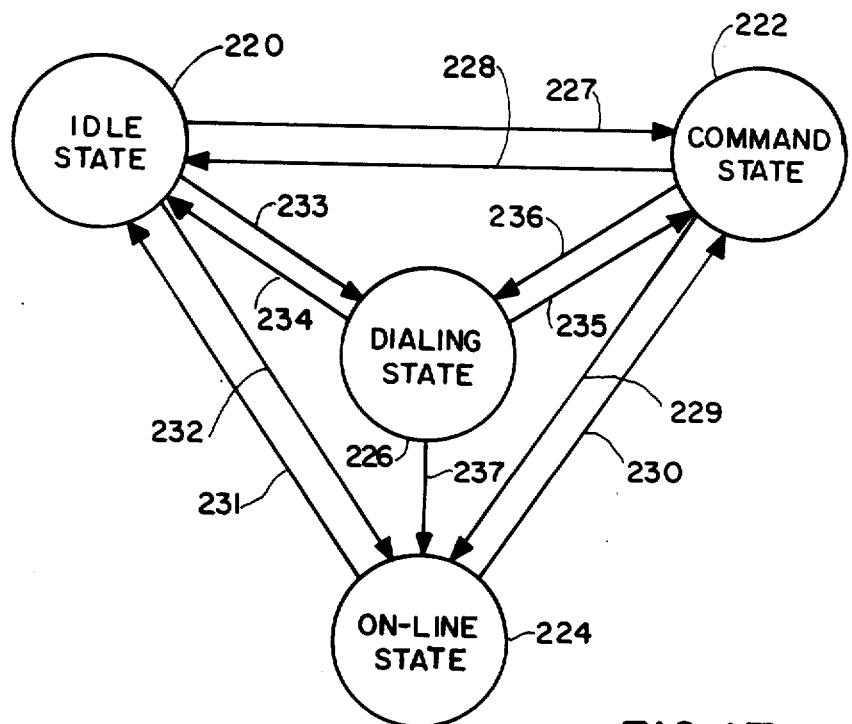
FIG. 17 is a preferred embodiment of the modem state diagram.

FIG. 17 is a preferred embodiment of the modem state diagram, showing the interrelationship between idle state 220, command state 222, on-line state 224 and the dialing state 226.

The path from idle state 220 to command state 222 is reached over line 227. From command state 222, the exit command to idle state is reached over line 228. The lost DTR (data terminal ready) is also reached over line 228.

The path from the command state 222 to the on-line state 224 is reached over line 229, under the following conditions: enter answer mode in on-line state, enter originate mode in on-line state, enter analog loop back state, and RI ring indication. The path from the on-line state 224 to the command state 222 is reached over line 230, under the following conditions: exit on-line state to command state, receive space signal, and lost carrier signal.

The path from on-line state 224 to idle state 220 is reached over line 231, under the following conditions: exit on line state to idle state, receive space lost carrier signal, and lost data terminal ready signal. Note that the path taken is responsive to the state from which the present state was entered.

The path from idle state 220 to on-line state 224 is reached over line 232, under the following conditions: RTS (leased) signal, and ring indication signal.

The path from idle state 220 to dialing state 226 is reached over line 233, under the following condition: RTS (dial up) signal.

The path from dialing state 226 to idle state 220 is reached over line 234, under the following condition: abort call. The path from dialing state 226 to command state 222 is reached over line 235, under the following condition: abort call. The path from the command state 222 to the dialing state 226 is reached over line 236, under the following condition: enter dial state signal.

The path from the dialing state 226 to the on-line state 224 is reached over line 237, under the following condition: answer tone received.

FIG. 18 illustrates the preferred embodiment of the read/write timing means. There are a plurality of SIEN pulses 238, preferably 16 SIEN pulses, within one controlled baud cycle 241. The controlled baud cycle 241 is generated by a clock signal, and the negative edge of the controlled baud cycle is represented by numeral 240. The controlled baud cycle is preferably a 600 baud cycle. The transmitter is preferably synchronized by the negative edge 240 of the baud clock.

The write pulse 242 preferably occurs within the first SIEN pulse following the negative edge 240 of the baud cycle. The write pulse 242 is validated by a chip select pulse 245.

The receive timing is derived from the received analog signal independent of the transmitter timing. The receive timing and the transmitter timing signal are allowed to drift relative to each other. The receiver is synchronized by the Pφ pulse 246. The Pφ pulse 246 can occur within any SIEN interval. Preferably, one Pφ pulse will occur within each controlled baud interval, plus or minus one SIEN interval.

The Pφ pulse 246 signals the microcomputer 28 that receive data from the signal processor 32 is available to be read. The microcomputer 28 provides the read pulse to the signal processor 32 within the same SIEN interval in which the Pφ pulse occurred. The read pulse 244 is validated by the chip select pulse 245.

The SIEN pulse 238 is preferably a minimum of 10 usec.

Figure 19:
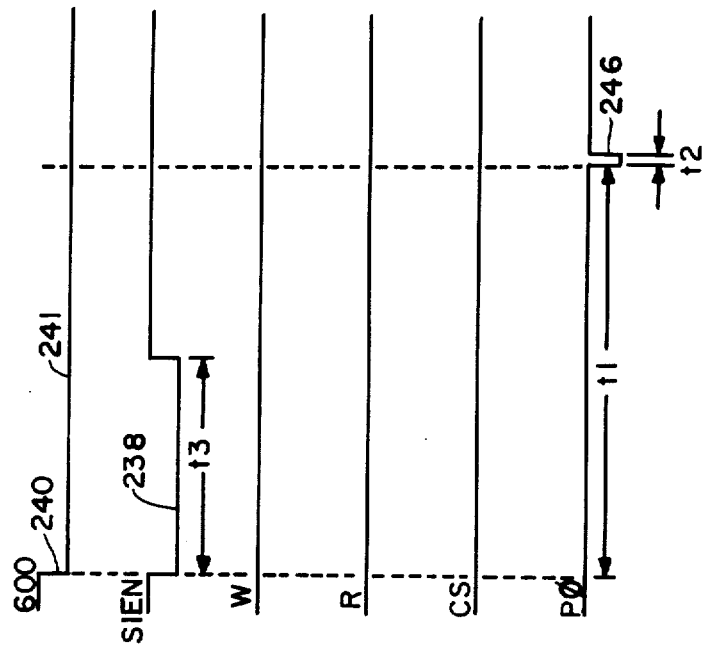
FIG. 19 illustrates the preferred embodiment of the 600-P0-SIEN diagram.

FIG. 19 shows a typical pulse width relationship between the SIEN pulse 238 and the Pφ pulse 246 of the controlled baud cycle. The SIEN pulse 238 is preferably 4.2 usec in width when measured from the negative edge 240 of the controlled baud cycle 241, as referenced by t3.

The Pφ pulse 246 is preferably 271 nsec in width as referenced by t2.

The timing from the negative edge 240 of the controlled baud cycle to the negative edge of the Pφ pulse 246 is preferably 7.8 usec. in width, as referenced by t1.

Figure 20:
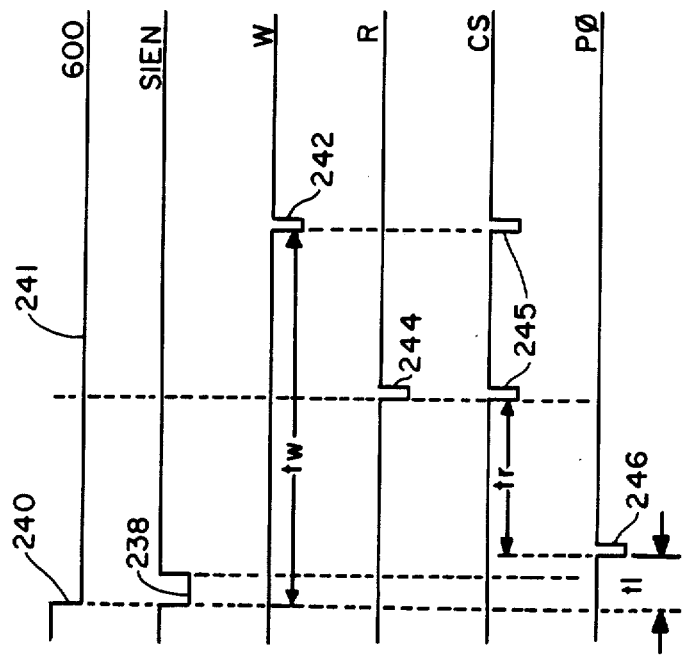
FIG. 20 illustrates the preferred minimum/maximum timing diagram.

FIG. 20 illustrates the preferred minimum/maximum timing diagram when the read/write occurs in the same SIEN interval. The preferred sampling rate is 9600 Hz.

One of the SIEN pulses 238 always occurs substantially in alignment with the negative edge 240 of the controlled baud cycle 241.

In the preferred embodiment, read pulse 244 always follows Pφ pulse 246 and precedes the write pulse 242. The write pulse 242 always precedes the next SIEN pulse 238. As shown in FIG. 20, the negative edge of the controlled baud cycle 241 is shown as numeral 240. The SIEN pulse 238 is shown in substantial alignment with the negative edge 240 of the controlled baud cycle. The write pulse 242 is shown a maximum of 90 usec from the negative edge 240 of the controlled baud cycle, as referenced by tw.

The Pφ pulse 246 is typically shown as 7.8 usec from the negative edge 240 of the controlled baud cycle, as referenced by t1. The negative edge of the chip select 245 is typically shown from 0 to 22 usec from the negative edge of the Pφ pulse 246 as referenced by tr.

FIG. 21 illustrates the preferred embodiment of the bus 30 during one cycle of the read/write SIEN interval. As shown in FIG. 21, the controlled baud cycle 241 has a positive edge 243. The SIEN pulse 238 is substantially aligned with the negative edge 240 of controlled baud cycle 241. Typically 16 SIEN pulses occur during each controlled baud cycle.

The Pφ pulse 246 occurs after the SIEN Pulse, and prior to the read pulse 244. A chip select pulse 245 is substantially in alignment with the read pulse 244, and another chip select pulse 245 is substantially in alignment with the write pulse 242.

Digital data signal 247 from bus 30 are latched 248 into microcomputer 28 by the alignment of read signals 244 and chip select signals 245. Received data (RXD) 249 from the remote modem follows the data change 248. After the microcomputer 28 has read the received data 249, then transmit data 250 is placed onto by-directional bus 30.

The data register in signal processor 32 can only contain read or write data. Ansynchronous protocol or synchronous internal protocol always uses internal transmit timing. With synchronous protocol, the signal processor 32 is driven by one of three timing sources: internal, external and slave timing. Slave timing synchronizes the transmitter to the receiver.

The signal processor 32 commands the microcomputer 28 to temporarily change bus 30 direction. Bi-directional bus 30 thus allows bi-directional transfer of digital data between microcomputer 28 and signal processor 32 within a single baud interval.

SIEN intervals may have one or both read/write pulses. Each read pulse and write pulse are single directional.

FIG. 21 shows one-half of a controlled baud cycle 241, with negative edge 240 and positive edge 243 shown at the top. Typically, there are eight SIEN pulses within each half baud interval.

The read pulse latches the received data from the signal processor 32 to microcomputer 28. The bus thus has eight lines of data. In the received direction, six of these lines contain data, while two lines denote direction.

In the transmit direction, all eight lines are used to transmit data. Given an eight bit bus, four combinations of dibits are possible: 00, 01, 10 or 11. Any three of these four dibits may be used for transmitted data with the fourth dibit reserved to denote receive direction.

Figure 22:
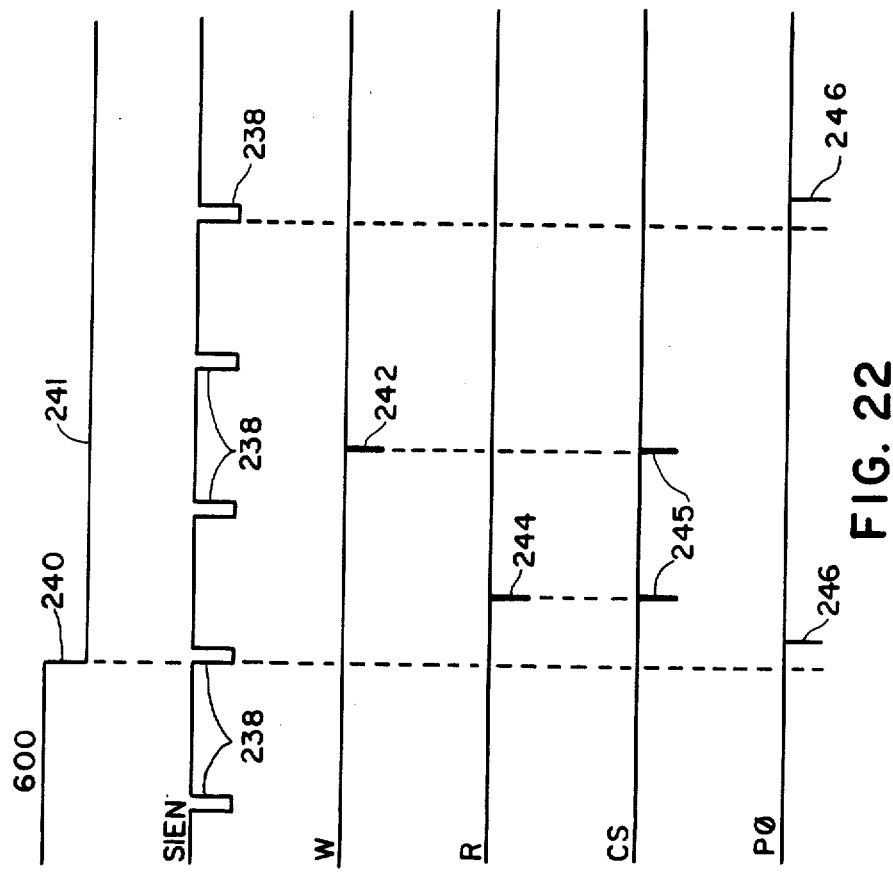
FIG. 22 discloses the preferred FSK timing diagram.

Referring now to FIG. 22, the preferred FSK timing diagram is disclosed. The controlled baud cycle 241 is shown with negative edge 240 in substantial alignment with SIEN pulse 238. P$\phi$ pulse 246 follows SIEN pulse 238 and the negative edge 240 of controlled baud cycle 241.

Read pulse 244 follows P$\phi$ pulse 246, and precedes write pulse 242. The CS pulse 245 is substantially aligned with read pulse 244, with a second CS Pulse substantially aligned with write pulse 242.

FIG. 23A and B disclose in chart form, the preferred communication modem connections. As noted in FIG. 23A, the preferred remote answering modem connections are based upon local originate modem speeds of 0-300, 1200 and 2400 b.p.s. according the U.S.A. and European specifications.

FIG. 23B discloses the preferred calling modem connections based upon local answering modem speeds of 0-300, 1200 and 2400 b.p.s. according to U.S.A. and European specifications.

While not shown in FIG. 23A or B, it should be noted that 600 b.p.s. connection may replace the 1200 b.p.s. connection if both are preconditioned for 600 b.p.s.

As previously noted, the U.S.A. specification protocol is recognized by a 2225 Hz answer tone. Conversely, the European specification protocol is recognized by a 2100 Hz answer tone or unscrambled mark.

Thus, the multi-speed, full duplex modem disclosed herein is compatible with both U.S.A. and European specifications, and is responsive to the operational speed of the remote modem, regardless of whether the remote modem is the originate 10 or answer modem 12.

Therefore, while this invention has been described with reference to a particular embodiment, it is to be understood that modifications may be made without departing from the spirit of the invention or from the scope of the following claims.

INDUSTRIAL APPLICABILITY

This invention discloses a multi-speed, full duplex modem for use in communcation of remote electrical equipment, such as computers, over a telephone network.

We claim:

1. A telephone network between an originate modem and an answer modem, at least one of said modems comprising a multi-speed full duplex modem apparatus for transmitting and receiving analog signals through said telephone network; said multi-speed, full duplex modem comprising:
    (a) a data terminal means for transmitting and receiving digital data;
    (b) a microcomputer means in communication with the data terminal means;
    (c) a bi-directional bus in communication with the microcomputer means;
    (d) a signal processor means in communication with the microcomputer means over the bi-directional bus;
    (e) a timing means responsive to the digital data, for bi-directional communication of digital data over the bi-directional bus;
    (f) a converting means in communication with the signal processor means for converting digital data from the signal processor to the analog signal for transmission over the telephone network, and for converting the received analog signal from the telephone network to the digital data; and
    (g) a selecting means in communication with the microcomputer means for selecting a bit rate mode using the digital data from the data terminal means; said selecting means further providing a means responsive to the bit rate of the originate modem, to selectively communicate one of at two or more data rates selected from 0-300 b.p.s. by frequency shift keying, approximately 600 b.p.s. by differential phase shift keying, approximately 1200 b.p.s. by quarternary differential phase shift keying, and approximately 2400 b.p.s. by quadrature amplitude modulation; the selecting means further providing a means for selecting digital data samples at intervals determined by the bit rate mode, to synthesize the digital data modulated for transmission through the converting means to the analog signal for transmission over the telephone network for communication between the originate modem and the answer modem.

2. The apparatus of claim 1, wherein a filter means is in communication with the converting means and the telephone network for filtering the analog signal for transmission between the converting means and the telephone network, and for filtering the received analog signal from the telephone network.

3. The apparatus of claim 1 wherein the bi-directional bus selectively transfers multiple bits of data in one of the transmit and receive directions, with one or more of the multiple bits of data restricted to convey bus direction data in one of the transmit and receive directions, and not restricted to convey bus direction data in the other of the transmit and receive directions.

4. The apparatus of claim 1, wherein the converting means is a coder/decoder.

5. The apparatus of claim 1, wherein the timing means comprises a transmit timing pulse and a receive timing pulse disposed within at least one of a plurality of SIEN intervals within a controlled baud cycle, plus or minus one SIEN interval.

6. The apparatus of claim 5, wherein the transmit timing pulse and the receive timing pulse are independent of each other, and are allowed to drift relative to each other.

7. The apparatus of claim 5, wherein the transmit timing pulse and the receive timing pulse may occur within the same SIEN interval.

8. The apparatus of claim 5, wherein the receive timing pulse is derived from the received analog signal.

9. The apparatus of claim 5, wherein the transmit timing pulse is derived from a clock signal.

10. The apparatus of claim 5, wherein the SIEN intervals and the controlled baud cycle each have a negative edge and the negative edge of one of the SIEN intervals is substantially aligned with the negative edge of the controlled baud cycle.

11. The apparatus of claim 5, wherein a read pulse, a write pulse, a P$\phi$ pulse and a chip select pulse are used to configure the timing means within the signal processor and the microcomputer.

12. The apparatus of claim 11, wherein the receive timing pulse is synchronized by a P$\phi$ pulse occurring within at least one SIEN interval within one controlled baud cycle, plus or minus one SIEN interval.

13. The apparatus of claim 11, wherein the read pulse is validated by the chip select pulse occurring within at least one SIEN interval within one controlled baud cycle, plus or minus one SIEN interval.

14. The apparatus of claim 11, wherein the read pulse follows the Pφ pulse and precedes the next adjacent SIEN pulse, within one controlled baud cycle, plus or minus one SIEN interval.

15. The apparatus of claim 11, wherein the read pulse is substantially in alignment with a first chip select pulse, and the write pulse is substantially in alignment with a second chip select pulse within one controlled baud cycle, plus or minus one SIEN interval.

16. The apparatus of claim 11, wherein the Pφ pulse occurs after the SIEN pulse and prior to the read pulse within one controlled baud cycle, plus or minus one SIEN interval.

17. The apparatus of claim 11, wherein one SIEN interval may have both a read pulse and a write pulse contained therein.

18. A multispeed, full duplex modem for communicating with a remote modem over a telephone network, which comprises:
   (a) a data terminal communication means, for transmitting and receiving digital data from a data terminal;
   (b) a microcomputer means in communication with the data terminal communication means;
   (c) a bi-directional bus for selectively transferring multiple bits of digital data in one of the transmit and receive directions, with one or more of the multiple bits of data restricted to convey bus direction data in one of the transmit and receive directions, and not restricted to convey bus direction data in the other of the transmit and receive directions;
   (d) a signal processor means in communication with the microcomputer means over the bi-directional bus;
   (e) a timing means responsive to the digital data, for bi-directional communication of digital data over the bi-directional bus;
   (f) a converting means in communication with the signal processor means for converting digital data from the signal processor to the analog signal for transmission over the telephone network, and for converting the received analog signal from the telephone network to the digital data; and
   (g) a selecting means in communication with the microcomputer means for selecting a bit rate mode using the digital data from the data terminal means; the selecting means further providing a means for selecting digital data samples at intervals determined by the bit rate mode, to synthesize the digital data modulated for transmission through the converting means to the analog signal for transmission over the telephone network for communication between the multispeed full duplex modem and the remote modem.

19. The modem of claim 18, wherein the signal processor means further comprises a means for storing a plurality of digital data samples corresponding to a sinusoidal waveform.

20. A multispeed, full duplex modem for communication with a remote modem over a telephone network, which comprises:
   (a) a data terminal means for transmitting and receiving digital data;
   (b) a microcomputer means in communication with the data terminal means;
   (c) a bi-directional bus in communication with the microcomputer means;
   (d) a signal processor means in communication with the microcomputer means over the bi-directional bus;
   (e) a timing means responsive to the digital data, for bi-directional communication of digital data over the bi-directional bus; the timing means further providing a transmit timing pulse and a receive timing pulse disposed within at least one of a plurality of SIEN intervals within a controlled baud cycle, plus or minus one SIEN interval;
   (f) a converting means in communication with the signal processor means for converting digital data from the signal processor to the analog signal for transmission over the telephone network, and for converting the received analog signal from the telephone network to the digital data; and
   (g) a selecting means in communication with the microcomputer means for selecting a bit rate mode using the digital data from the data terminal means; the selecting means further providing a means for selecting digital data samples at intervals determined by the bit rate mode, to synthesize the digital data modulated for transmission through the converting means to the analog signal for transmission over the telephone network for communication between the multispeed, full duplex modem and the remote modem.

* * * * *